(12) United States Patent  
Ishiyama

(10) Patent No.: US 8,922,941 B2  
(45) Date of Patent: Dec. 30, 2014

(54) LIBRARY APPARATUS, CARTRIDGE, AND HAND MECHANISM

(75) Inventor: Kazunori Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 5 days.

(21) Appl. No.: 13/332,784

(22) Filed: Dec. 21, 2011

(65) Prior Publication Data

US 2012/0212117 A1 Aug. 23, 2012

(30) Foreign Application Priority Data

Feb. 22, 2011 (JP) .................. 2011-036488

(51) Int. Cl.  
*G11B 15/68* (2006.01)  
*G11B 23/04* (2006.01)

(52) U.S. Cl.  
CPC .......... *G11B 23/041* (2013.01); *G11B 15/6835* (2013.01)  
USPC ...................................................... 360/92.1

(58) Field of Classification Search  
None  
See application file for complete search history.

(56) References Cited

U.S. PATENT DOCUMENTS

| | | | | |
|---|---|---|---|---|
| 5,422,774 A | * | 6/1995 | Ommori et al. | 360/132 |
| 5,652,682 A | * | 7/1997 | Elliott | 360/92.1 |
| 6,072,657 A | | 6/2000 | Konno | |
| 7,359,145 B2 | * | 4/2008 | Ridl | 360/98.06 |
| 2010/0254039 A1 | | 10/2010 | Kawasaki et al. | |

FOREIGN PATENT DOCUMENTS

| | | |
|---|---|---|
| JP | 60-50747 | 3/1985 |
| JP | 62-104493 | 7/1987 |
| JP | 10-241238 | 9/1998 |
| WO | 2006-103735 | 10/2006 |
| WO | 2009/041374 A1 | 4/2009 |
| WO | 2010/134888 A1 | 11/2010 |

OTHER PUBLICATIONS

Japanese Office Action issued Oct. 21, 2014 in corresponding Japanese Office Action 2011-036488.

* cited by examiner

Primary Examiner — David D Davis  
(74) Attorney, Agent, or Firm — Staas & Halsey LLP

(57) ABSTRACT

A library apparatus includes a storage section having a lock hole in which a lock member provided on a cartridge is capable of being fitted, the storage section storing the cartridge in a locked state when the lock member is fitted in the lock hole, a holding portion that holds the cartridge and engages with the lock member, an arm that supports the holding portion at an end of the arm, the arm inserting and extracting the cartridge held by the holding portion into and from the storage section, a first motor that moves the arm in an insertion-extraction direction in which the cartridge is inserted and extracted, and a second motor that moves the holding portion so as to move the lock member to a position at which the lock member is released from the lock hole.

10 Claims, 18 Drawing Sheets

LOCKED STATE

UNLOCKED STATE

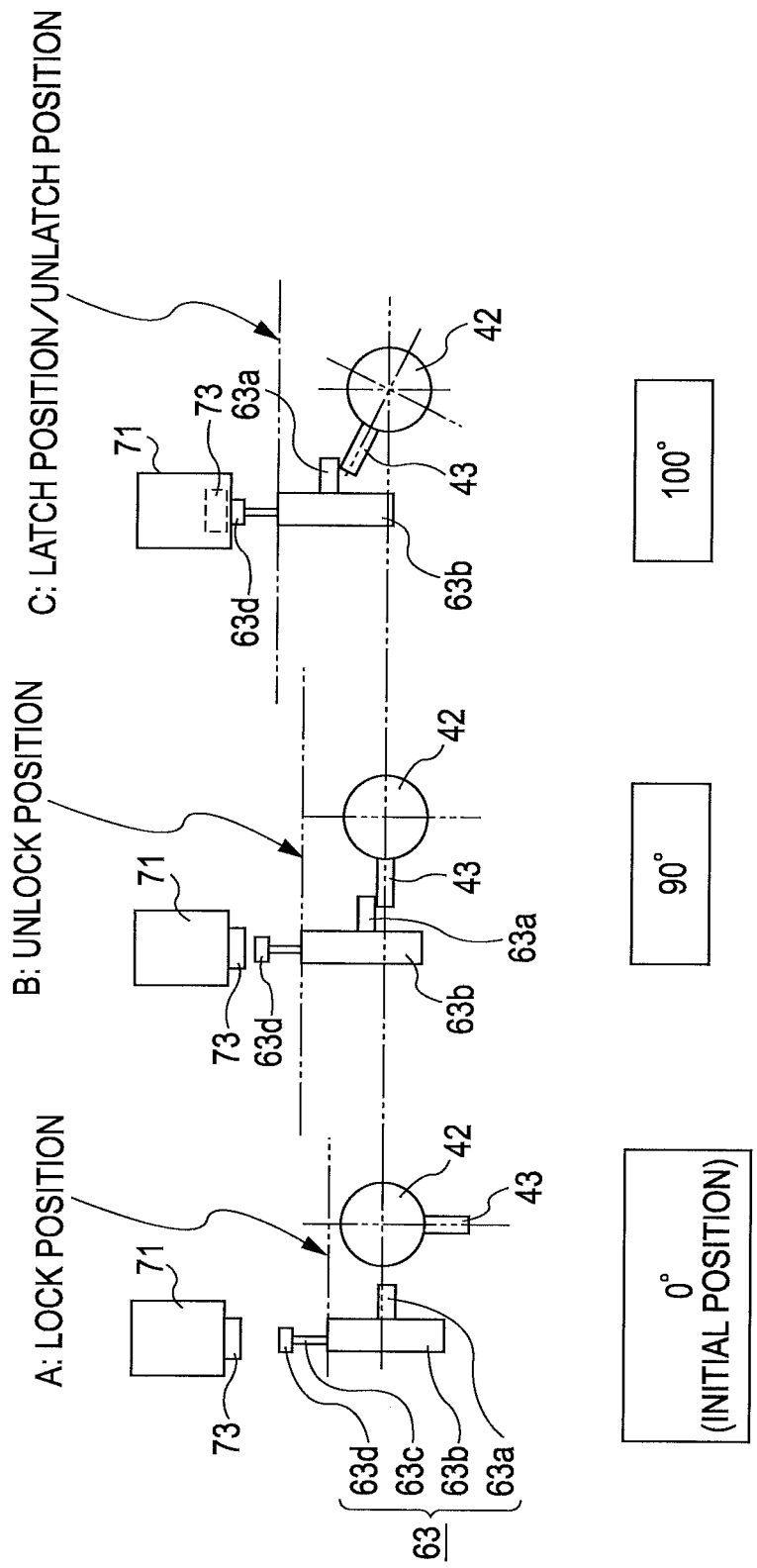

LIBRARY APPARATUS, CARTRIDGE, AND HAND MECHANISM

CROSS-REFERENCE TO RELATED APPLICATION

This application is based upon and claims the benefit of priority of the prior Japanese Patent Application No. 2011-036488, filed on Feb. 22, 2011, the entire contents of which are incorporated herein by reference.

FIELD

The disclosed technology relates to a library apparatus, a cartridge, and a hand mechanism.

BACKGROUND

A library apparatus is known as an external bulk storage that is used while being connected to a mainframe computer. A magnetic tape library apparatus is an example of a library apparatus.

Such a magnetic tape library apparatus generally includes storage units (magazines) which each store multiple magnetic tape cartridges that house magnetic tape media, a conveying mechanism that conveys the magnetic tape cartridges, and a magnetic tape drive that reads and writes data to and from the magnetic tape media.

The magazines in the magnetic tape library apparatus are individually operated and managed by an operator. Therefore, the magazines are structured such that they may be pulled out or detached from the magnetic tape library apparatus when the operator replaces the magnetic tape cartridges. However, the manner in which the magazines are handled differs depending on the operator, and there is a possibility that the magazines will be handled in a manner unexpected by the designer.

In addition, each magazine has openings through which the magnetic tape cartridges are inserted and extracted in a side surface thereof, and is therefore to be handled such that the openings do not face downward and the magnetic tape cartridges do not fall from the magazine. If the operator carries the magazine such that the openings face downward by mistake, there is a risk that the magnetic tape cartridges will fall from the magazine to the floor. In such a case, there is a possibility that the magnetic tape cartridges will be damaged and important data stored therein will be lost.

Accordingly, a technology for preventing the magnetic tape cartridges from falling from the magazine by providing a lock mechanism that locks the magnetic tape cartridges in the magazine has been proposed (see, for example, International Publication Pamphlet No. WO2006/103735 and Japanese Laid-open Patent Publication No. 10-241238).

FIGS. 18A and 18B are diagrams illustrating a known lock member. FIGS. 18A and 18B illustrate a cell 81 that serves as a storage section in a magazine. FIG. 18A illustrates a locked state in which a cartridge 80 is locked in the magazine (cell 81).

A lock member 83 is provided on a side wall surface 81$h$ of the cell 81. The lock member 83 is fixed to the side wall surface 81$h$ of the cell 81 with a fixing portion 82 provided at an end of the lock member 83. The lock member 83 includes an arm portion 84 that has spring characteristics. An engagement portion 85 that engages with an engagement groove 80$m$ formed in the cartridge 80 is provided at an end of the arm portion 84. When the engagement portion 85 engages with the engagement groove 80$m$, the cartridge 80 is locked in the magazine (cell 81).

FIG. 18B illustrates the manner in which the cartridge 80 is inserted into or extracted from the cell 81 in the direction indicated by arrow A (insertion-extraction direction). FIG. 18B illustrates an unlocked state in which the cartridge 80 is not locked in the magazine (cell 81).

When the cartridge 80 is inserted into the cell 81, the engagement portion 85 of the lock member 83 is pushed by the cartridge 80 and is moved outward through an opening 81$k$ formed in the side wall surface 81$h$ of the cell 81. Then, when the engagement portion 85 faces the engagement groove 80$m$, the engagement portion 85 is returned to the original position by the elastic force generated by the arm portion 84. Accordingly, the engagement portion 85 engages with the engagement groove 80$m$ and the cartridge 80 is locked in the magazine (cell 81).

When the cartridge 80 is extracted from the cell 81, the cartridge 80 is pulled by a force larger than a frictional resistance (locking force) between the engagement portion 85 and the engagement groove 80$m$. Accordingly, the engagement portion 85 of the lock member 83 is pushed by the cartridge 80 and is moved outward through the opening 81$k$ formed in the side wall surface 81$h$ of the cell 81. Thus, the engagement portion 85 is disengaged from the engagement groove 80$m$ and the cartridge 80 is released from the locked state.

With regard to the above-described lock member, it is desirable to effectively design the locking force of the lock member to ensure the reliability of the locked state. However, in practice, there are variations in the surface state of the cartridge, the shape of the engagement groove, the frictional resistance between the engagement portion and the engagement groove, etc., and high-level analyses are preferably performed to design the locking force.

Accordingly, the reliability of the locked state may be increased by increasing the locking force applied by the lock member. However, if the locking force is increased, a hand mechanism including a hand motor with a high inserting-and-extracting performance may be used to reliably release the cartridge from the locked state and extract the cartridge. Thus, although the above-described lock member seems to have a simple structure, the lock member is desirably precisely designed in consideration of the balance between the locking force and the inserting-and-extracting performance to ensure the reliability of the locking and unlocking operation.

In addition, recently, the storage capacity of a single magnetic tape cartridge has been rapidly increased. Therefore, the number of magnetic tape cartridges that are to be prepared to provide a certain storage capacity has been reduced. As a result, the sizes of the magazine and the magnetic tape library apparatus have been reduced.

Accordingly, there has been a demand for a small lock mechanism capable of reliably preventing cartridges from falling from a magazine. In addition, there has been a demand for an unlocking mechanism capable of releasing the cartridges from the locked state established by the lock mechanism without increasing the size of the library apparatus that has been reduced.

SUMMARY

According to an aspect of the invention, a library apparatus includes a storage section having a lock hole in which a lock member provided on a cartridge is capable of being fitted, the storage section storing the cartridge in a locked state when the lock member is fitted in the lock hole, a holding portion that holds the cartridge and engages with the lock member, an arm that supports the holding portion at an end of the arm, the arm inserting and extracting the cartridge held by the holding portion into and from the storage section, a first motor that moves the arm in an insertion-extraction direction in which the cartridge is inserted and extracted, and a second motor that moves the holding portion so as to move the lock member to a position at which the lock member is released from the lock hole.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram illustrating the positional relationship between a holding portion and the lock member.

DESCRIPTION OF EMBODIMENTS

Figure 1:
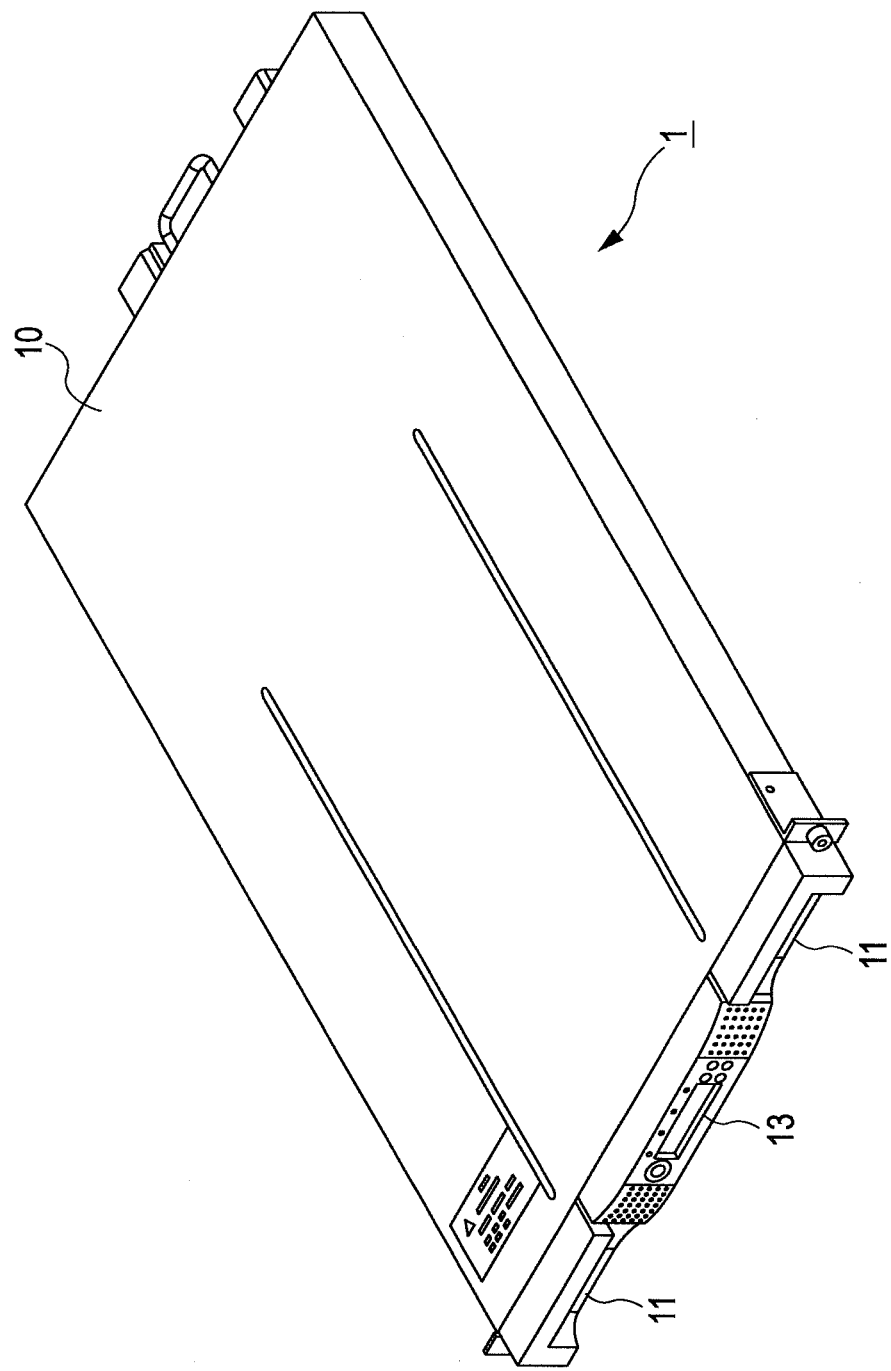
FIG. 1 illustrates an external view of a magnetic tape library apparatus.

Embodiments will now be described in detail with reference to the drawings. A magnetic tape library apparatus will be described as an example of a library apparatus. FIG. 1 illustrates an external view of a magnetic tape library apparatus 1.

The magnetic tape library apparatus 1 includes a housing 10 that has a storage space therein and an operator panel 13 that is provided with operation buttons and a display. Storage units (magazines) 11 that may be inserted into and extracted from the housing 10 are arranged next to each other at both sides of the operator panel 13.

Figure 2:
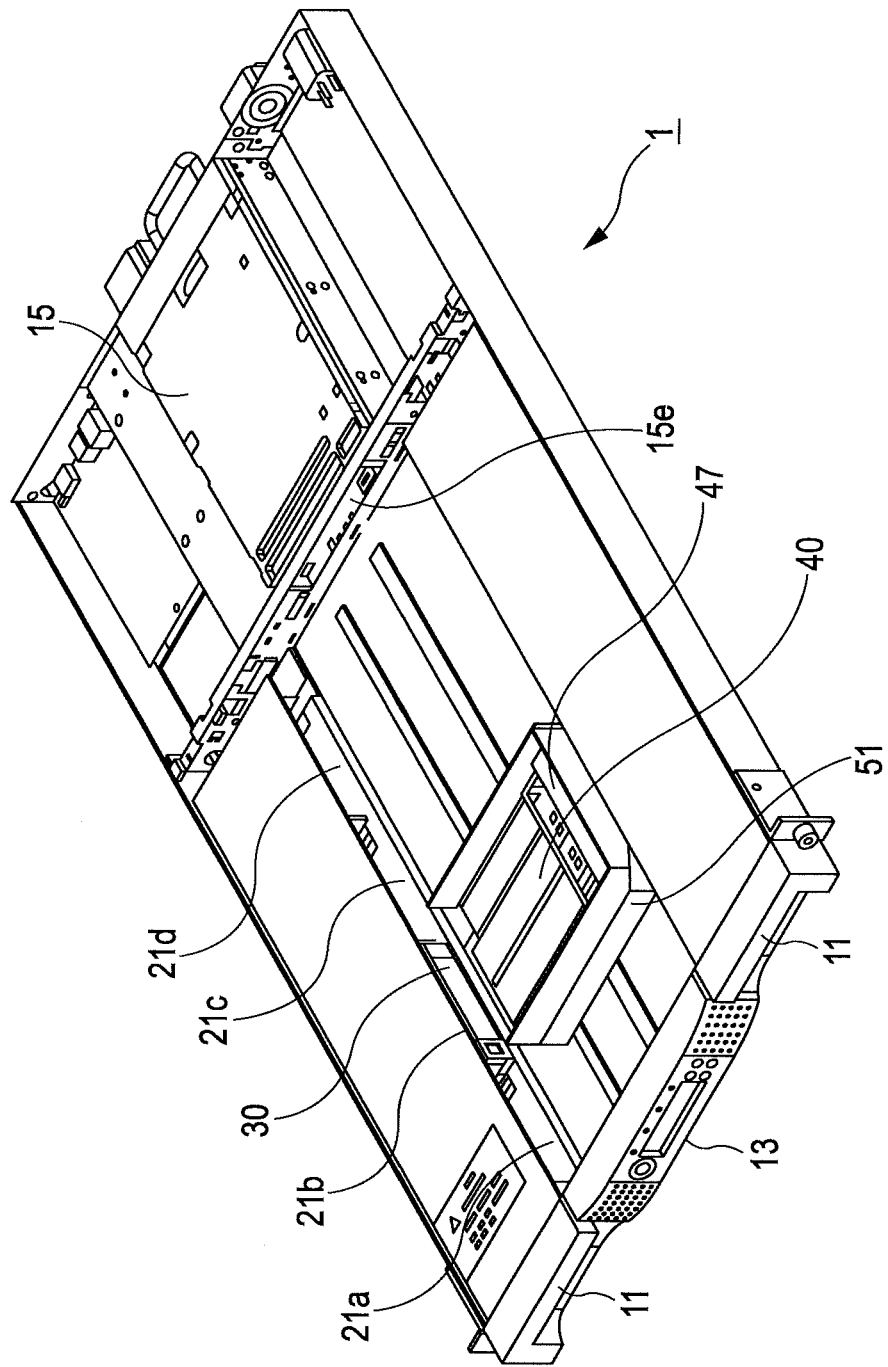
FIG. 2 illustrates the internal structure of the magnetic tape library apparatus.

FIG. 2 illustrates the internal structure of the magnetic tape library apparatus 1. The inner space of the housing 10 is divided into two storage spaces. One of the storage spaces that is at the front side of the apparatus houses the operator panel 13, the magazines 11, and a robot mechanism 40. The other one of the storage spaces that is at the rear side of the apparatus houses a magnetic tape drive 15 and other electronic circuit components.

Each of the magazines 11 includes a plurality of cells 21a to 21d, each of which serves as a storage section for receiving a single magnetic tape cartridge 30. Thus, each magazine 11 is capable of receiving multiple magnetic tape cartridges 30 such that the magnetic tape cartridges 30 are arranged in a longitudinal direction. Here, a single-stage magazine that has a single shelf is described as an example of each magazine 11. However, magazines having a multi-stage structure in which magnetic tape cartridges are stored while being arranged in a vertical direction (up-down direction) may instead be used.

The robot mechanism 40 is disposed between the left and right magazines 11. The robot mechanism 40 includes a robot motor (not illustrated) that moves a robot 51 in the front-rear direction (direction in which the magazines 11 are inserted and extracted) and rotates the robot 51. The robot mechanism 40 includes a hand mechanism 47.

The robot mechanism 40 takes out, for example, the magnetic tape cartridge 30 that is stored in the cell 21b of one of the magazines 11 with a hand mechanism 47 and conveys the magnetic tape cartridge 30 to the magnetic tape drive 15. Then, the hand mechanism 47 inserts the magnetic tape cartridge 30 into the magnetic tape drive 15 through an insertion/extraction slot 15e.

The magnetic tape drive 15 reads or writes data to or from the inserted magnetic tape cartridge 30. Then, the robot mechanism 40 receives the magnetic tape cartridge 30 that has been ejected and returns the magnetic tape cartridge 30 to the cell 21b in the magazine 11.

Figure 3:
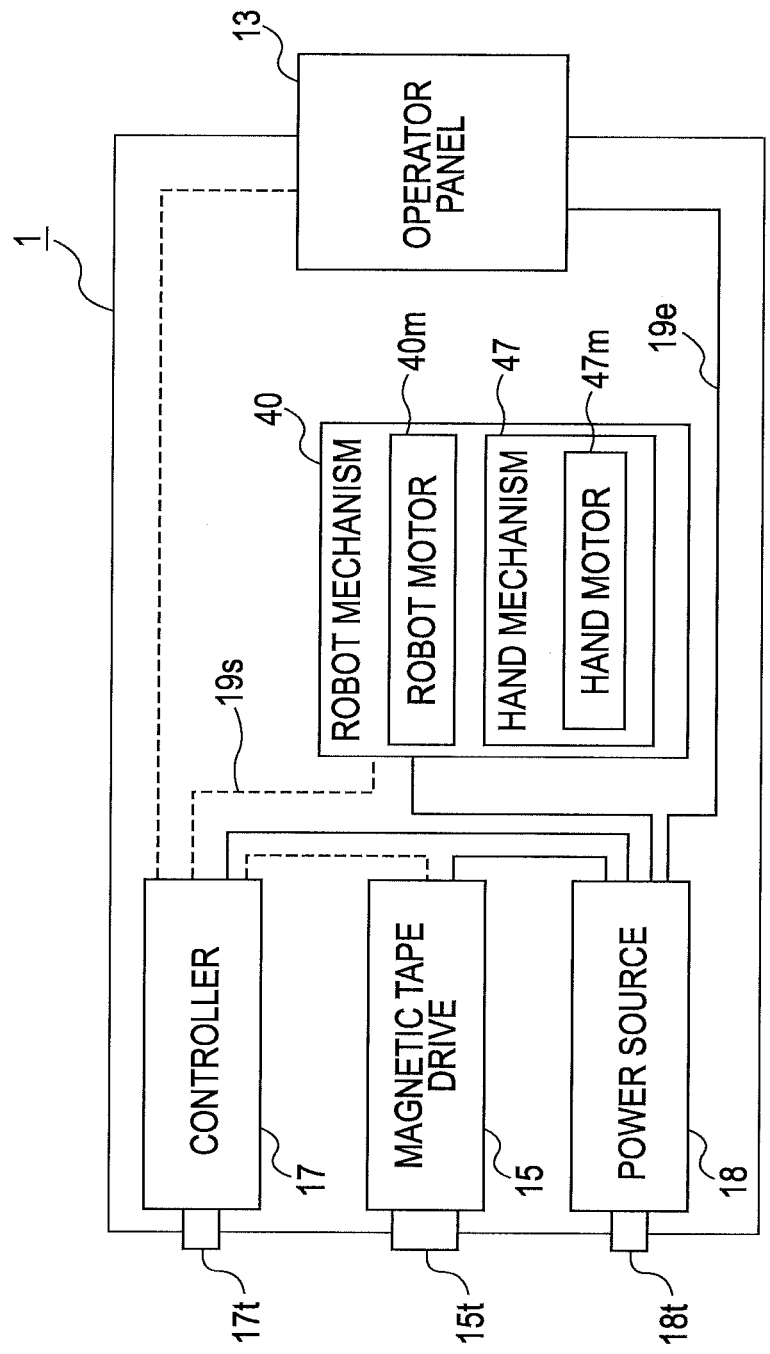
FIG. 3 is a block diagram of the magnetic tape library apparatus.

FIG. 3 is a block diagram of the magnetic tape library apparatus 1. In the magnetic tape library apparatus 1, signal lines 19s connect a controller 17 to the operator panel 13, the magnetic tape drive 15, and the robot mechanism 40. Electric power is supplied from a power source 18 to the controller 17, the operator panel 13, the magnetic tape drive 15, and the robot mechanism 40 through power lines 19e.

The robot mechanism 40 includes a robot motor 40m that is driven based on a command from the controller 17. The hand mechanism 47 includes a hand motor 47m that is also driven based on a command from the controller 17.

An input-output terminal 15t of the magnetic tape drive 15, an input-output terminal 17t of the controller 17, and an input-output terminal 18t of the power source 18 are arranged on the rear surface of the apparatus. The input-output terminal 15t of the magnetic tape drive 15 is connected to a host computer (not illustrated) through an interface. The input-output terminal 17t of the controller 17 is also connected to the host computer (not illustrated) through an interface. The input-output terminal 18t of the power source 18 is connected to an alternating-current power source.

Figure 4A:
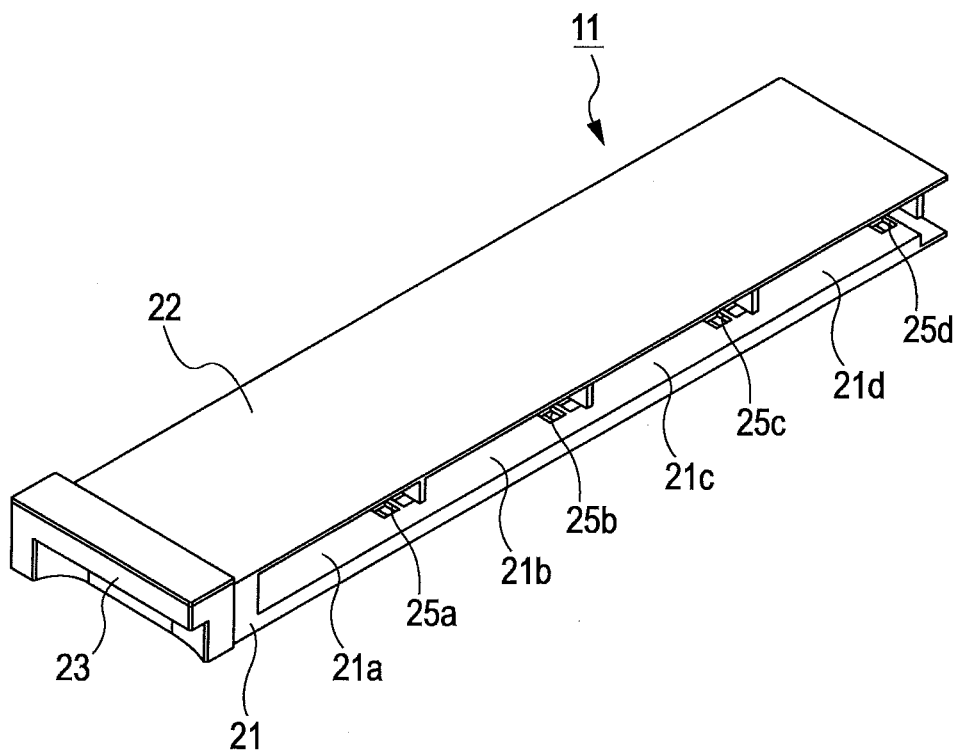
FIGS. 4A and 4B are diagrams illustrating the structure of a magazine.
Figure 4B:
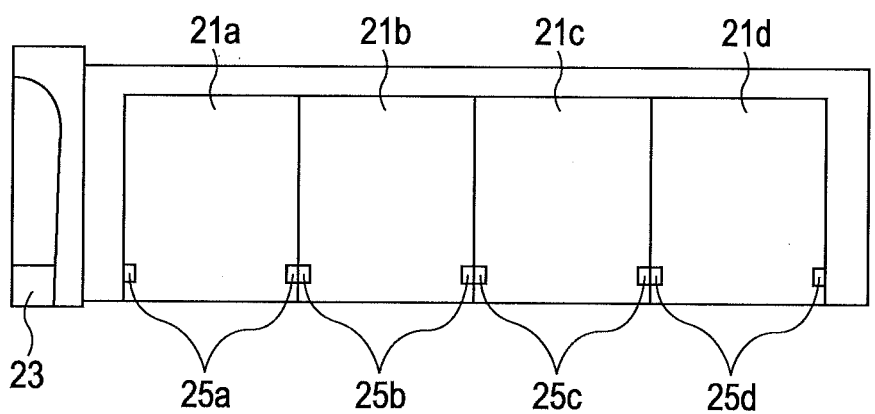

FIGS. 4A and 4B illustrate the structure of each magazine 11. FIG. 4A is an external view of one of the magazines 11. FIG. 4B is a top view of the magazine 11. The magazine 11 includes a lower wall portion 21, an upper wall portion 22, and a grip portion 23 that is exposed at the front side of the apparatus. The cells 21a to 21d that are sectioned from each other such that the cells 21a to 21d may receive the magnetic tape cartridges 30 individually are formed in the storage space between the lower wall portion 21 and the upper wall portion 22.

The cells 21a to 21d are respectively provided with lock holes 25a to 25d that are engageable with lock members, which will be described below. Although through holes will be explained as examples of the lock holes 25a to 25d, the lock holes 25a to 25d may instead be formed as dent portions (recesses). As illustrated in FIG. 4B, two lock holes are formed in each of the cells 21a to 21d.

The lock holes 25a to 25d are arranged in areas within the external shapes of the cartridges in a stored state. Therefore, it is not necessary that the cells 21a to 21d have additional spaces for arranging the lock holes 25a to 25d, and the size of the magazine 11 may be reduced accordingly.

The lock holes 25a to 25d do not obstruct the insertion of cartridges that do not have the lock members, which will be described below, into the cells 21a to 21d. Thus, the magazine 11 is capable of receiving various types of cartridges and the library apparatus has high versatility.

Figure 5:
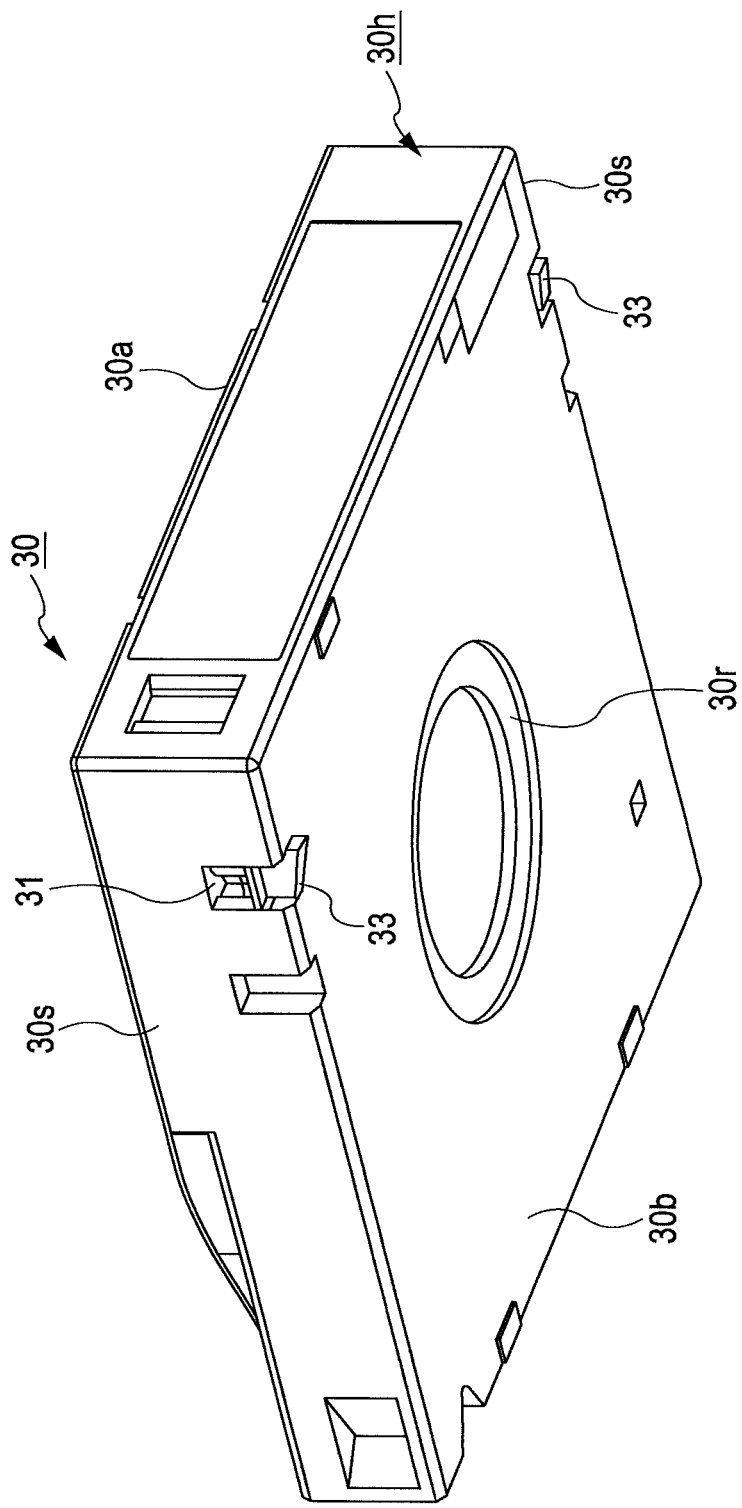
FIG. 5 is an external view of a magnetic tape cartridge.

FIG. 5 is an external view of each magnetic tape cartridge 30. The magnetic tape cartridge 30 has a housing 30h having a plurality of wall surfaces including a top surface 30a, a bottom surface 30b, and side surfaces 30s. A magnetic tape that is wound around a reel 30r is placed in the housing 30h of the magnetic tape cartridge 30. Magnetic tape cartridges of this type are generally standardized to ensure compatibility with magnetic tape drives.

In the present embodiment, to arrange lock members 33 without changing the external shape according to the standard, grooves formed in side surfaces 30s at both sides of the housing 30h are used as holding grooves 31. Accordingly, compatibility with magnetic tape drives that comply with the standard may be ensured. Alternatively, the holding grooves 31 may be additionally formed in the cartridge. In such a case, the cartridge is designed in advance in consideration of compatibility with the magnetic tape drive.

The left and right holding grooves 31 are used by the hand mechanism 47 to handle the magnetic tape cartridge 30. The lock members 33 are arranged in the holding grooves 31. The lock members 33 and the lock holes 25a to 25d form a lock mechanism.

Figure 6:
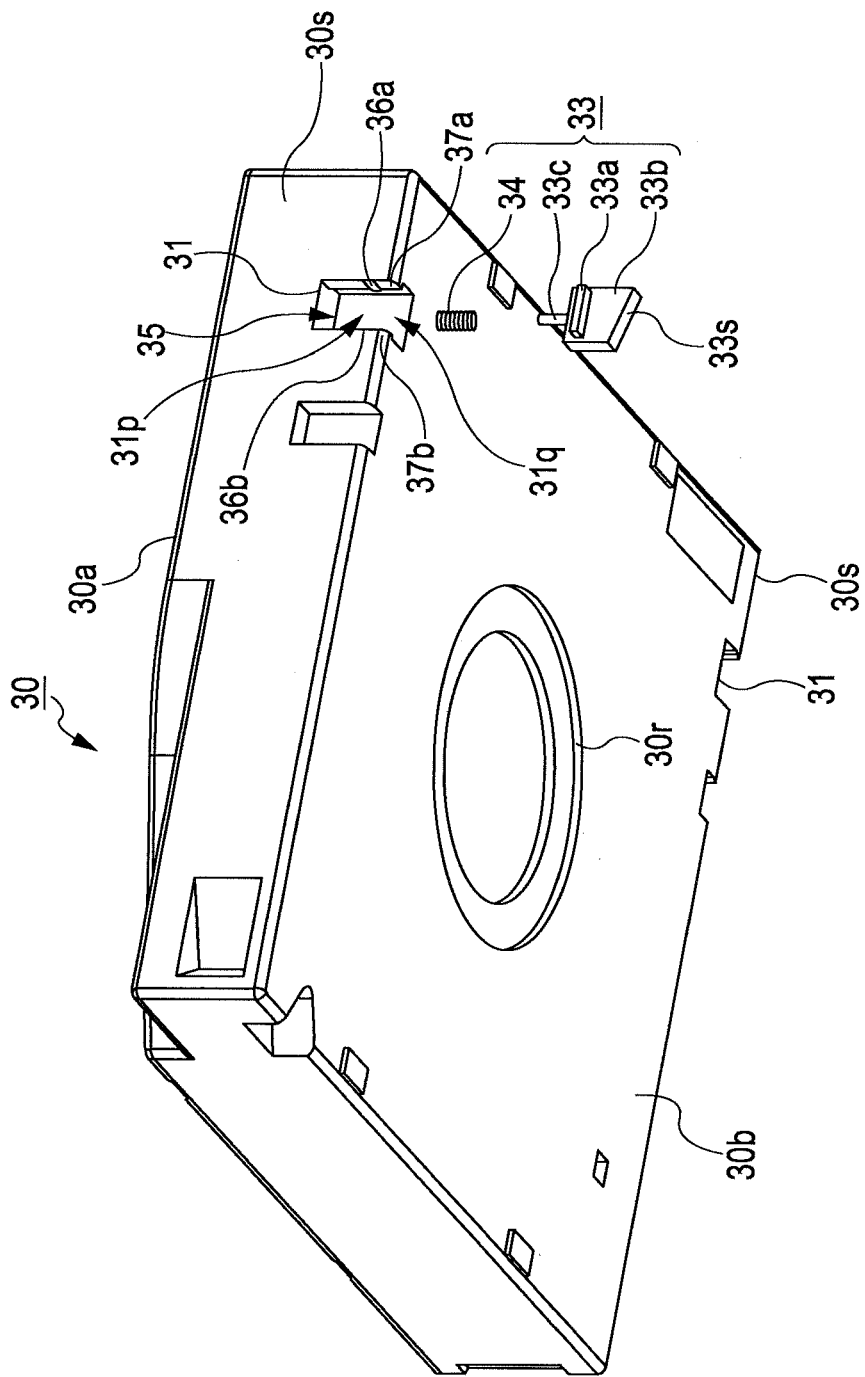
FIG. 6 is a diagram illustrating a lock member according to a first embodiment.
Figure 7:
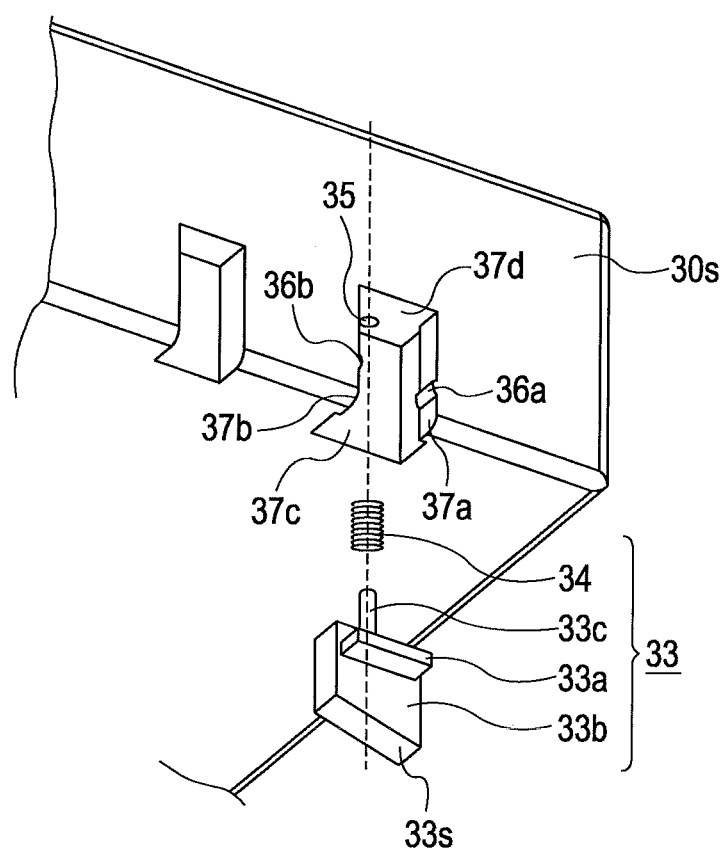
FIG. 7 is an exploded perspective view of the lock member according to the first embodiment.
Figure 8A:
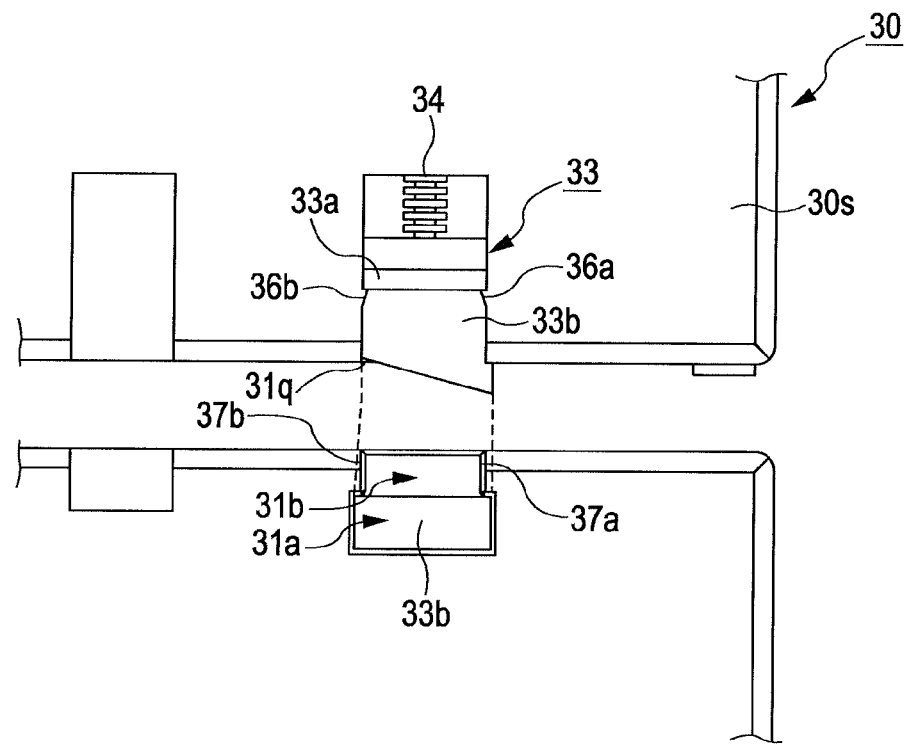
FIGS. 8A and 8B are plan views illustrating the lock member according to the first embodiment.
Figure 8B:
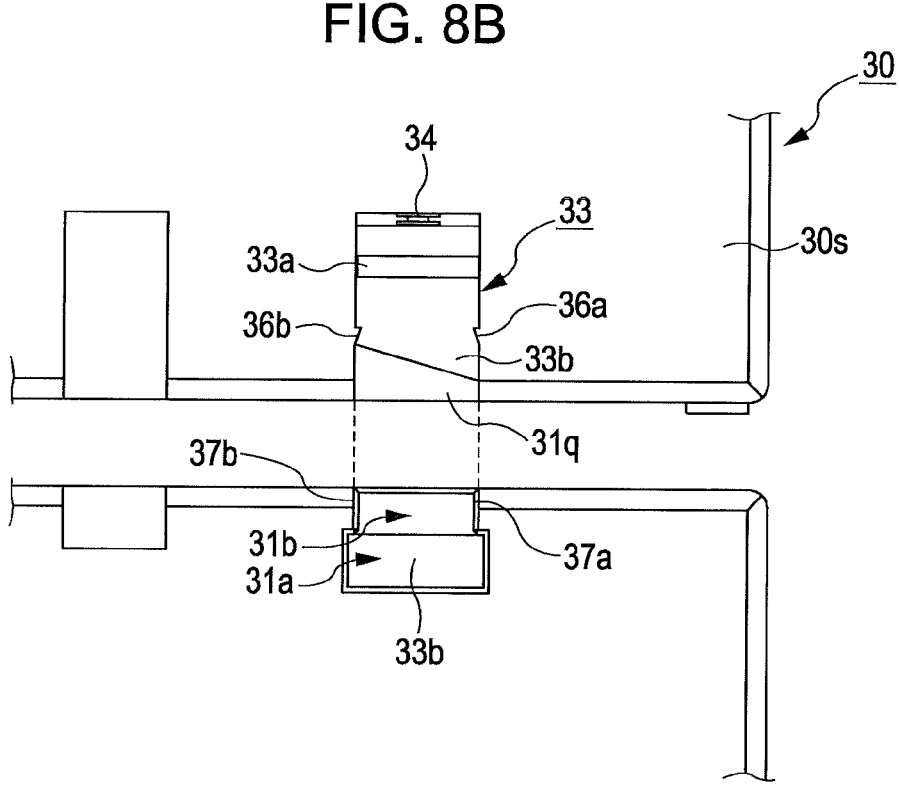

FIG. 6 is a diagram illustrating one of the lock members 33 according to the first embodiment. FIG. 7 is an exploded perspective view of the lock member 33 according to the first embodiment. FIGS. 8A and 8B are plan views illustrating the lock member 33 according to the first embodiment.

Referring to FIGS. 6 and 7, the lock member 33 includes a projecting portion 33a, which is an example of an extending portion, a main portion 33b, a shaft portion 33c, and a coil spring 34, which is an example of an elastic member. The projecting portion 33a is a projection that extends substantially perpendicularly from a main wall surface of the main portion 33b. Instead of the projection, a step that extends substantially perpendicularly from a main wall surface of the main portion 33b may be formed on an upper section of the main portion 33b as the extending portion.

The main portion 33b is a flat plate including flat main wall surfaces and an inclined surface 33s at the bottom end of the main wall surfaces. The shaft portion 33c, which retains the lock member 33, is arranged on the top side of the main portion 33b. The coil spring 34 is fitted to the shaft portion 33c, and the shaft portion 33c is inserted into a hole 35 formed in an upper section of the holding groove 31.

The size of the lock member 33 is set such that the lock members 33 may be placed in the holding groove 31. In other words, the sizes of the main portion 33b, the projecting portion 33a, etc., are determined in advance such that the lock member 33 does not protrude from the external shape of the cartridge housing 30h in the state in which the magnetic tape cartridge 30 is not locked in the magazine 11 (unlocked state).

The holding groove 31 has a first opening 31p and a second opening 31q. The first opening 31p opens in the corresponding side surface 30s of the cartridge housing 30h, and a holding portion of the hand mechanism 47, which will be described below, may be inserted into holding groove 31 through the first opening 31p. The second opening 31q opens in the bottom surface 30b of the cartridge housing 30h, and a bottom end part of the main portion 33b moves into and out of the holding groove 31 through the second opening 31q.

In the present embodiment, the first opening 31p and the second opening 31q are connected to each other. The shape of the second opening 31q may be changed to, for example, a through hole in accordance with the shape of the bottom end part of the main portion 33b.

The holding groove 31 is surrounded by side walls 37a and 37b, a bottom wall 37c, and a top wall 37d. Stoppers 36a and 36b are provided on the side walls 37a and 37b, respectively. The coil spring 34 is pressed against the top wall 37d, so that the urging force of the coil spring 34 is applied to the main portion 33b.

FIG. 8A illustrates the state in which the magnetic tape cartridge 30 is locked in the magazine 11 (locked state), and FIG. 8B illustrates the state in which the magnetic tape cartridge 30 is not locked in the magazine 11 (unlocked state). As illustrated in FIGS. 8A and 8B, the side walls 37a and 37b are formed so as to protrude toward the center of the holding groove 31 such that a space 31b at the open side has a smaller width than a width of a space 31a at the bottom-wall-37c side.

The main portion 33b is placed in the space 31a at the bottom-wall-37c side, and the projecting portion 33a is placed in the space 31b at the open side. Thus, the lock member 33 is placed in the holding groove 31 such that the projecting portion 33a projects toward the first opening 31p.

The external shape of the projecting portion 33a is designed such that the projecting portion 33a does not project outward from the space 31b, so that the projecting portion 33a does not protrude from the external shape of the cartridge housing 30h. Therefore, when the stoppers 36a and 36b are arranged to restrict the projecting portion 33a from moving downward, the lock member 33 is prevented from falling from the housing 30h. The lock member 33 is retained in the housing 30h such that the projecting portion 33a is vertically movable between the top wall 37d and the stoppers 36a and 36b.

In the locked state illustrated in FIG. 8A, the main portion 33b is pushed downward by the urging force of the coil spring 34, and the bottom end part (inclined surface 33s) of the main portion 33b protrudes outward from the second opening 31q by a certain amount. In other words, the bottom end part of the main portion 33b protrudes by the certain amount from the bottom surface 30b of the cartridge housing 30h. The amount by which the bottom end part protrudes may be controlled by adjusting the positions at which the stoppers 36a and 36b are located.

With regard to the unlocked state illustrated in FIG. 8B, when the lock member 33 is pushed upward (in a direction opposite to the urging direction), the coil spring 34 contracts and the bottom end portion (inclined surface 33s) of the main portion 33b is pulled upward through the bottom surface 30b of the cartridge housing 30h. In other words, the bottom end part of the main portion 33b is pulled up into the holding groove 31 through the second opening 31q. Thus, the lock member 33 is disengaged from a lock hole, which will be described below, and is released from the locked state.

Figure 9:
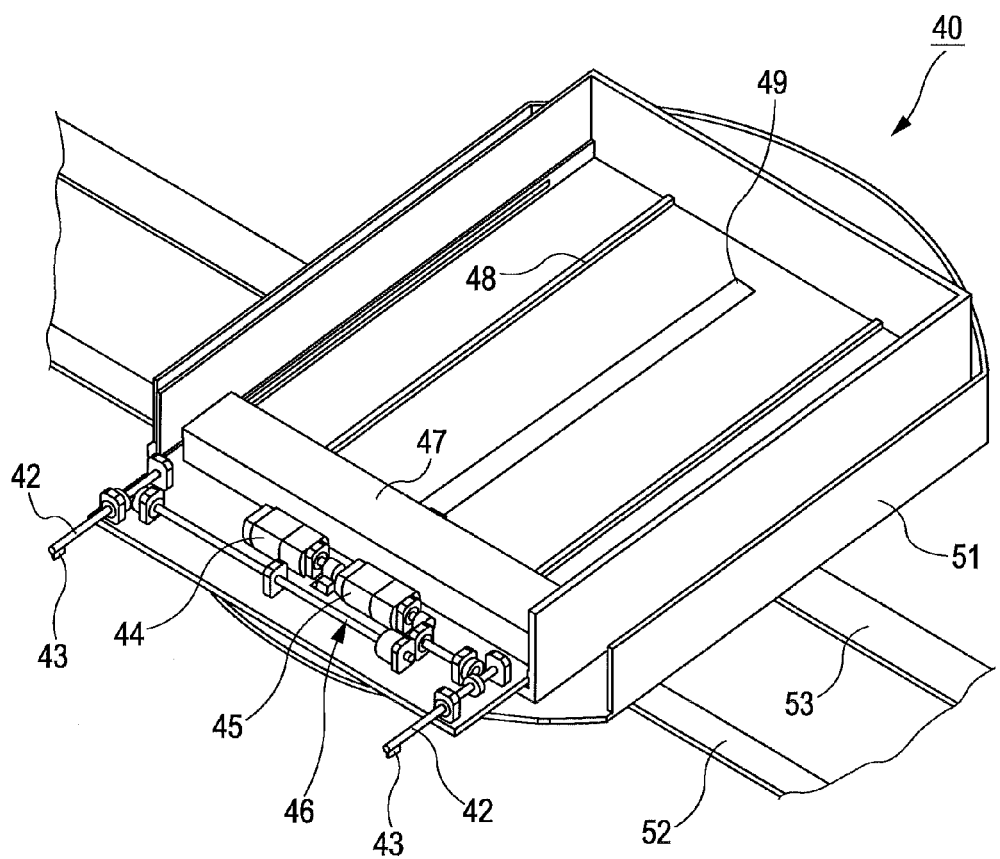
FIG. 9 is a perspective view of a robot mechanism.

FIG. 9 is a perspective view of the robot mechanism 40. The robot mechanism 40 includes a robot motor (not illustrated) that is provided at the bottom side of the robot 51. The robot 51 is moved by the robot motor in the front-rear direction (direction in which each magazine 11 is inserted and extracted) along a guide rail 52 and a rack gear 53. Thus, the robot mechanism 40 is capable of conveying the magnetic tape cartridges 30 to the magnetic tape drive 15 and returning the magnetic tape cartridges 30 to the magazines 11.

The robot 51 includes the hand mechanism 47. The hand mechanism 47 includes a pair of arms 42 and is driven by the hand motor 47m. The hand motor 47m includes a first motor 44 that moves the hand mechanism 47 in a horizontal direction and a second motor 45 that rotates each of the arms 42. The hand mechanism 47 is moved horizontally along guide rails 48 and a rack gear 49 by the first motor 44. A link mechanism 46 transmits the power of the second motor 45 to the pair of arms 42 to rotate holding portions 43 of the arms 42.

The holding portions 43, which are flat-plate shaped, are provided at the distal ends of the arms 42 so as to extend in the longitudinal direction of the arms 42. Since the holding portions 43 are flat-plate shaped, the holding portions 43 may be easily positioned with respect to contact surfaces of the respective projecting portions 33a that come into contact with the holding portions 43. Accordingly, the holding portions 43 may be reliably brought into surface contact or line contact with the contact surfaces. As a result, the projecting portions 33a may be easily pushed up by the holding portions 43.

The shape of the holding portions 43 may be changed as appropriate. For example, although not illustrated, the holding portions 43 may be formed in the shape of rods (pins) that are perpendicular to the arms 42. In this case, the holding portions 43 are brought into line contact or point contact with the respective flat surfaces of the projecting portions 33a.

The thickness of the holding portions 43 is less than or equal to the width (diameter) of the arms 42. Accordingly, the width of the cells 21a to 21d may be set to the sum of the width of the magnetic tape cartridges 30, the total width of the pair of arms 42, and an appropriate allowance.

Thus, the space of the cells 21a to 21d may be reduced. Accordingly, the size of the magazines 11 may be reduced by reducing the length thereof in the longitudinal direction. As a result, the size of the magnetic tape library apparatus may be reduced.

The holding portions 43 may be rotated by a certain rotational angle by rotating the arms 42. Accordingly, the hand mechanism 47 may retain each magnetic tape cartridge 30 with the pair of holding portions 43. In addition, the hand mechanism 47 may easily place or remove each magnetic tape cartridge 30 onto or from the robot 51 by horizontally moving the arms 42 with the first motor 44.

Since the hand mechanism 47 according to the present embodiment is structured as described above, the hand mechanism 47 may handle cartridges that are not provided with the lock members as those included in the magnetic tape cartridges 30. In addition, the hand mechanism 47 according to the present embodiment may also be applied to library apparatuses that do not include the lock mechanisms formed as the combination of the lock holes 25a to 25d and the lock members 33.

In other words, the hand mechanism 47 according to the present embodiment may be applied to library apparatuses without the lock mechanisms or library apparatuses that include other types of lock mechanisms. Accordingly, even when the hand mechanism according to the present embodiment is not used in combination with the cartridges according to the first embodiment or cartridges according to a second embodiment, which will be described below, the space of the cells may be reduced and the length of the magazines in the longitudinal direction may be reduced accordingly. As a result, the size of the library apparatus may be reduced.

Figure 10A:
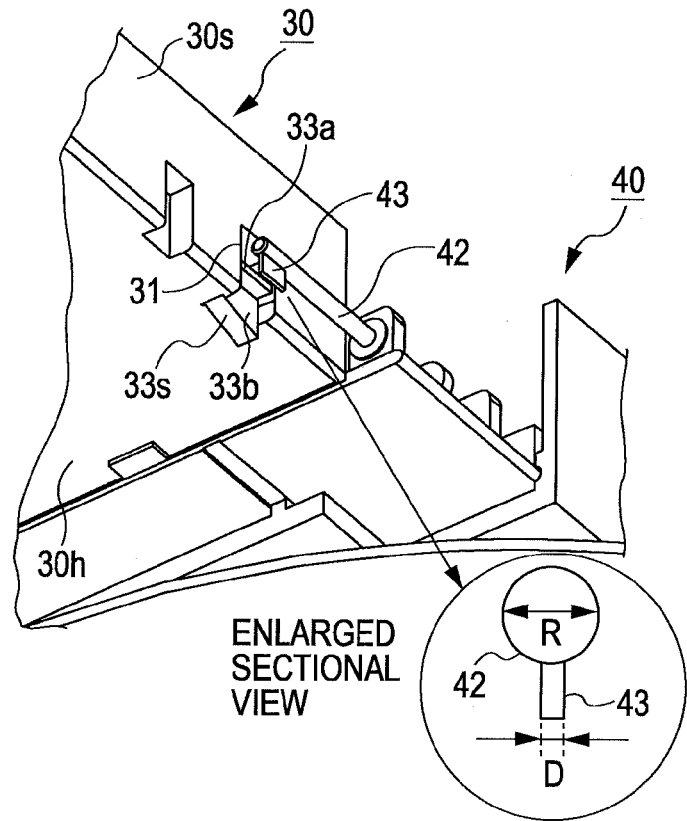
FIGS. 10A and 10B are diagrams illustrating the operation of an arm according to the first embodiment.
Figure 10B:
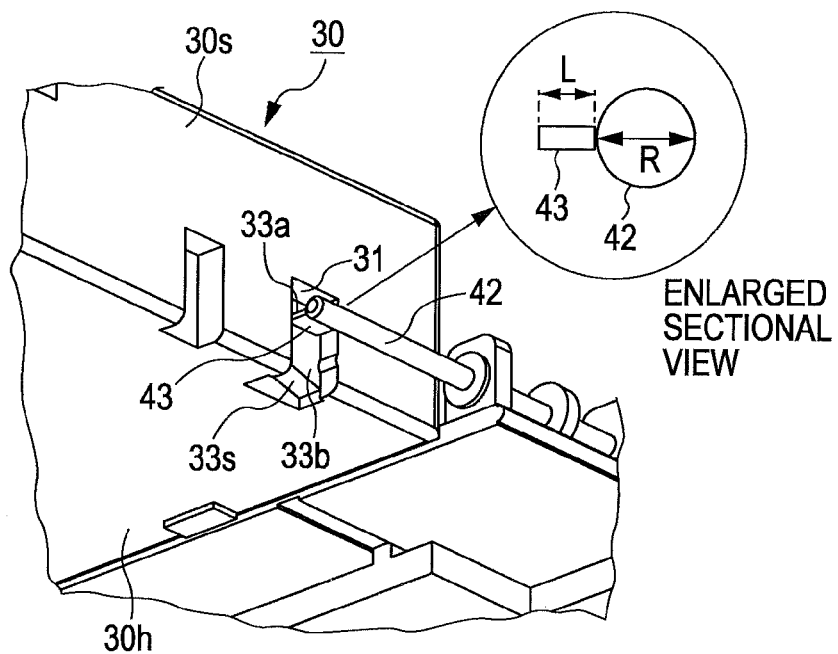
Figure 11A:
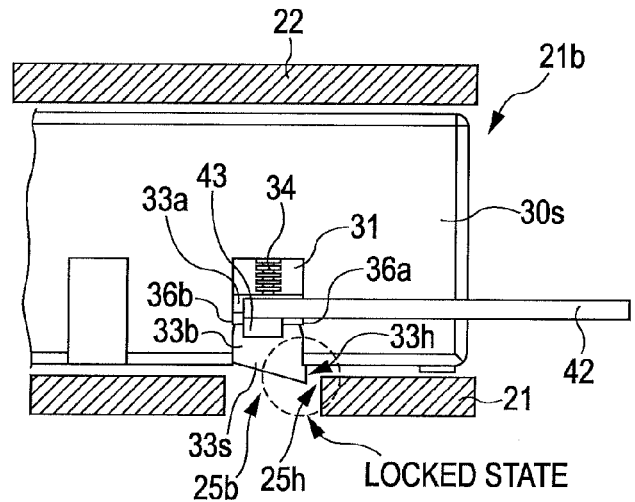
FIGS. 11A to 11C are plan views illustrating the state in which the arm and the lock member are engaged with each other according to the first embodiment.
Figure 11B:
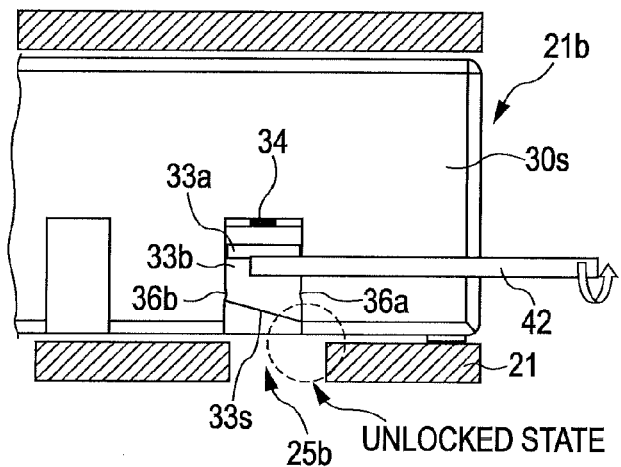
Figure 11C:
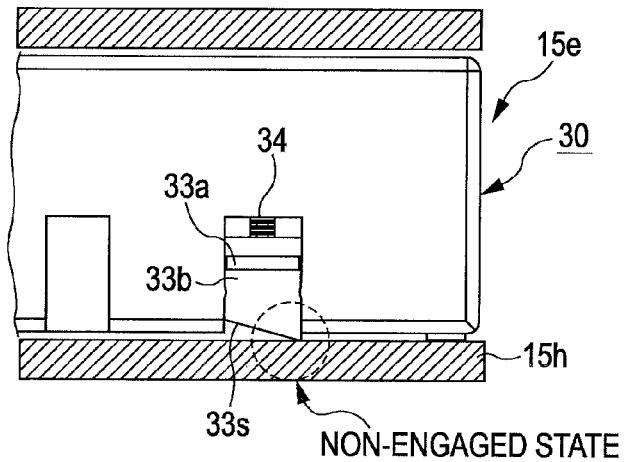

FIGS. 10A and 10B are diagrams illustrating the operation of one of the arms 42 according to the first embodiment. FIGS. 11A to 11C are plan views illustrating the state in which the arm 42 and the corresponding lock member 33 are engaged with each other according to the first embodiment. The magnetic tape cartridge 30 stored in the cell 21b illustrated in FIG. 2 will be described as an example.

FIGS. 10A and 11A illustrate the locked state. The magnetic tape cartridge 30 is inserted into the cell 21b in the magazine 11 by an operator. The inclined surface 33s of the lock member 33 is inclined toward the open side of the cell 21b, and a part of the main portion 33b that is adjacent to the open side forms an acute angle. The acute angle may be set arbitrarily, but is preferably in the range of 10° to 30°.

When the magnetic tape cartridge 30 is inserted into the cell 21b, the inclined surface 33s comes into contact with the lower wall portion 21 of the magazine 11 so that the lock member 33 is pushed into the holding groove 31. Then, when the main portion 33b faces the lock hole 25b, the main portion 33b is pushed downward by the urging force of the coil spring 34 and the bottom end part (inclined surface 33s) thereof projects into the lock hole 25b through the second opening 31q.

Thus, the magnetic tape cartridge 30 may be easily inserted into the magazine 11 by the operator. When the lock member 33 is fitted in the lock hole 25b, the magnetic tape cartridge 30 cannot be easily taken out since a wall 33h of the main portion 33b near the open side of the cell 21b comes into contact with a wall 25h of the lock hole 25b.

In other words, unless the operator releases the lock member from the locked state by pushing the lock member upward with a finger, a jig, or the like, the magnetic tape cartridge 30 cannot be easily taken out. Thus, the lock mechanism according to the present embodiment reliably prevents the magnetic tape cartridge 30 from falling from the magazine (cell).

Since the lock member 33 easily wears owing to the sliding operation, the lock member 33 is easily formed of a material having a high friction resistance, a high wear resistance, and a high sliding performance. The material may be, for example, POM (polyacetal resin).

After the magazine 11 is inserted into the magnetic tape library apparatus 1, locking and unlocking operations are performed by the pair of arms 42 in the hand mechanism 47. The robot mechanism 40 receives a command to move the magnetic tape cartridge 30 in the cell 21b to the magnetic tape drive 15 from the controller 17. Accordingly, the robot mechanism 40 drives the robot motor to move the hand mechanism 47 to the position where the hand mechanism 47 faces the cell 21b.

Then, the hand mechanism 47 is horizontally moved by the first motor 44 so that each arm 42 is inserted into the cell 21b. As illustrated in FIGS. 10A and 11A, each arm 42 is inserted into the cell 21b such that the holding portion 43 thereof faces the corresponding holding groove 31 in the magnetic tape cartridge 30. At this time, the holding surface of the holding portion 43 is parallel to the side surface 30s.

In addition, as illustrated in the enlarged sectional view of the arm 42 in FIG. 10A, the thickness D of the holding portion 43 is less than or equal to the width (diameter R) of the arm 42. Therefore, when the holding surface of the holding portion 43 is parallel to the side surfaces 30s, the width of the arm 42 is equal to the diameter R. Accordingly, the width in the horizontal direction of the space that is large enough to insert and extract each arm 42 into and from the cell 21b may be set to the sum of the width of the arm 42 and a certain allowance.

Thus, the space of the cell 21b may be reduced. Accordingly, as described above, the space of the cells 21a to 21d may be reduced. As a result, the size of the magazine 11 may be reduced by reducing the length thereof in the longitudinal direction.

Then, each arm 42 is rotated by the second motor 45 such that the holding portion 43 is rotated by about 90°. Accordingly, as illustrated in FIGS. 10B and 11B, the holding portion 43 is inserted into the holding groove 31 through the first opening 31p and comes into contact with the projecting portion 33a.

In the present embodiment, the size of the projecting portion 33a is such that the projecting portion 33a may be placed inside the first opening 31p. However, the size of the projecting portion 33a may instead be such that the projecting portion 33a protrudes from the first opening 31p. In such a case, the holding portion 43 may be brought into contact with the projecting portion 33a without inserting the holding portion 43 into the holding groove 31 through the first opening 31p.

In the enlarged sectional view of the arm 42 in FIG. 10B, the width of the arm 42 in the horizontal direction is the sum of the diameter R of the arm 42 and the width L of the holding portion 43. The holding portion 43 is designed in consideration of the arrangement of the holding groove 31 and the lock member 33, the distance between the arm 42 and the side surface 30s of the magnetic tape cartridge 30, and other factors. Accordingly, the holding portion 43 may be positioned in the holding groove 31 and brought into contact with the projecting portion 33a.

Then, the holding portion 43 is rotated so as to push the projecting portion 33a upward. Accordingly, the lock member 33 is moved upward and placed in the holding groove 31. As a result of this operation, the main portion 33b is disengaged from the lock hole 25b and the lock member 33 is released from the locked state. While the unlocked state is maintained, the hand mechanism 47 is horizontally moved by the first motor 44 so that the magnetic tape cartridge 30 is pulled out from the cell 21b and placed on the robot 51.

Then, the robot mechanism 40 conveys the magnetic tape cartridge 30 to the magnetic tape drive 15. Next, the robot 51 is rotated by 90° so that the hand mechanism 47 faces the insertion/extraction slot 15e in the magnetic tape drive 15. Each arm 42 in the hand mechanism 47 is horizontally moved by the first motor 44 so as to push the magnetic tape cartridge 30 out of the robot 51 and into the insertion/extraction slot 15e.

As illustrated in FIG. 11C, the magnetic tape drive 15 has no lock holes. Therefore, the lock member 33 is simply pressed against a wall surface 15h by the urging force of the coil spring 34. In other words, the lock member 33 is in a non-engaged state.

The magnetic tape cartridge 30 may be inserted into a magazine that does not have the lock holes according to the present embodiment. However, in such a case, the lock member 33 is set to a non-engaged state similar to the state illustrated in FIG. 11C, and does not provide the locking function. Thus, the magnetic tape cartridge 30 is compatible with other types of magazines and library apparatuses.

Then, when the magnetic tape cartridge 30 is ejected from the insertion/extraction slot 15e in the magnetic tape drive 15, each arm 42 of the hand mechanism 47 is horizontally moved by the first motor 44 so that the holding portion 43 of each arm 42 faces the corresponding holding groove 31 in the magnetic tape cartridge 30. At this time, the holding surface of the holding portion 43 is parallel to the side surface 30s.

Then, each arm 42 is rotated by the second motor 45 such that the holding portion 43 is rotated by about 90°. Accordingly, the holding portion 43 comes into contact with the projecting portion 33a and pushes the projecting portion 33a upward so that the lock member 33 is placed in the holding groove 31. In this state, each arm 42 of the hand mechanism 47 is horizontally moved by the first motor 44 so that the magnetic tape cartridge 30 is pulled out from the magnetic tape drive 15 and placed on the robot 51. Accordingly, the main portion 33b is prevented from sliding along the wall surface 15h of the magnetic tape drive 15 and becoming worn.

Next, the robot mechanism 40 conveys the magnetic tape cartridge 30 to the cell 21b. The robot 51 is rotated by −90° so that the hand mechanism 47 faces the open side of the cell 21b. The magnetic tape cartridge 30 is inserted into the cell 21b while the projecting portion 33a is being pushed upward by the holding portion 43.

Then, the holding portion 43 is rotated by −90° and is returned to the initial position (0°). Accordingly, the holding surface of the holding portion 43 becomes parallel to the side surface 30s. Thus, the projecting portion 33a is disengaged from the holding portion 43, and the lock member 33 is pushed downward by the urging force of the coil spring 34 and fitted into the lock hole 25b. The hand mechanism 47 is horizontally moved by the first motor 44 while the holding portion 43 of each arm 42 is at the initial position (0°), so that each arm 42 is moved away from the cell 21b.

Figure 12:
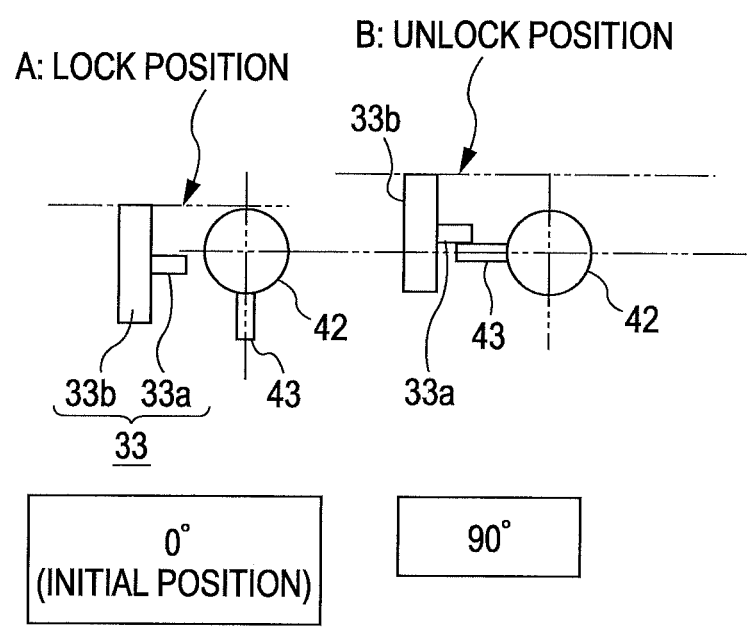
FIG. 12 is a diagram illustrating the positional relationship between a holding portion and the lock member.

FIG. 12 is a diagram illustrating the positional relationship between the holding portion 43 of one of the arms 42 and the corresponding lock member 33. FIG. 12 illustrates the state in which, for example, the arm 42 is inserted in the cell 21b. The left half of FIG. 12 illustrates the state in which the main portion 33b is fitted in the lock hole 25b in the cell 21b and the magnetic tape cartridge 30 is locked in the magazine 11 by the lock member 33.

At this time, the lock member 33 is at a lock position A. In addition, the holding portion 43 of the arm 42 is at an angular position of 0° (initial position). In this state, the lock member 33 and the holding portion 43 of the arm 42 are not engaged with each other. As illustrated in FIG. 12, the contact surface of the projecting portion 33a that comes into contact with the holding portion 43 is positioned below the rotational center of the arm 42 in the locked state.

Then, when the holding portion 43 is rotated, the holding portion 43 engages with the projecting portion 33a of the lock member 33 and pushes the main portion 33b upward. When the angular position is about 90°, the lock member 33 reaches an unlock position B. At this time, the main portion 33b is disengaged from the lock hole 25b and the magnetic tape cartridge 30 is released from the magazine 11.

When the magnetic tape cartridge 30 is inserted into one of the cells 21a to 21d by the hand mechanism 47, each lock member 33 is maintained at the unlock position B, as described above. In other words, the holding portion 43 is maintained at the angular position of about 90°. Therefore, when the holding portion 43 is at the angular position of about 90°, the holding portion 43 may release the magnetic tape cartridge 30 from the magazine 11 and hold the magnetic tape cartridge 30 at the same time. When the process of inserting the magnetic tape cartridge 30 into one of the cells 21a to 21d is completed, the holding portion 43 is rotated by about −90° and is returned to the initial position (0°).

Thus, when each lock member 33 is at the unlock position, the magnetic tape cartridge 30 may be smoothly inserted into or extracted from one of the cells 21a to 21d without causing friction between the lock member 33 and the cells 21a to 21d.

As described above, the lock mechanism using the cartridge according to the first embodiment performs the locking and unlocking operations by using the rotation of the holding portion 43 of each arm 42. By driving the holding portion 43, the locked state may be reliably established without using a lock member that is designed in consideration of the lock force. In addition, the unlocked state may be reliably established without making the structure of the hand mechanism 47 complex (without using a large high-performance hand motor) in consideration of the inserting-and-extracting performance.

Therefore, according to the lock mechanism using the cartridge of the first embodiment, the locked state and the unlocked state may be reliably established by using a small structure without increasing the sizes of the magazines and the library apparatus or making the structures thereof complex.

Figure 13:
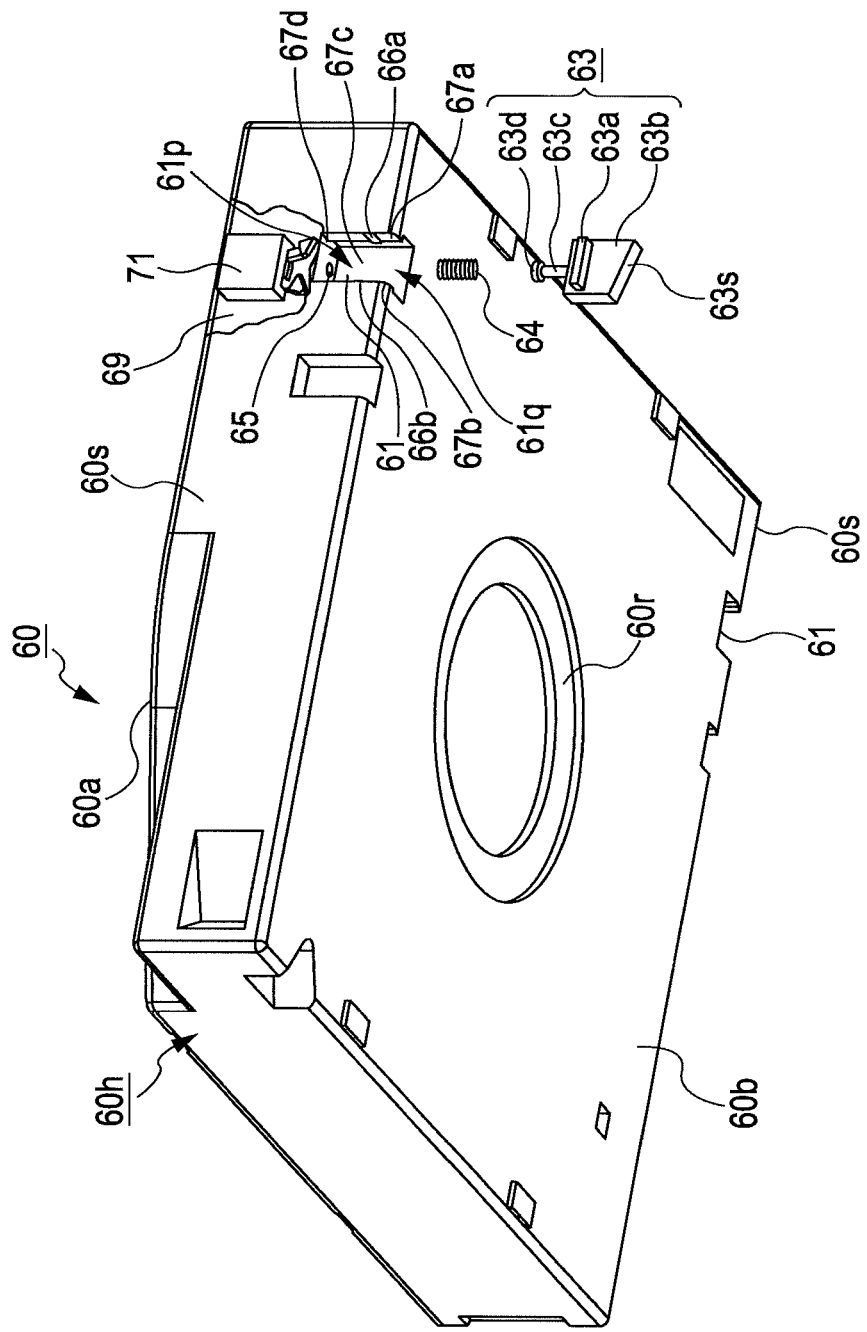
FIG. 13 is a diagram illustrating a lock member according to a second embodiment.

FIG. 13 illustrates one of lock members according to a second embodiment. A magnetic tape cartridge 60 illustrated in FIG. 13 is structured such that a latch member 71 is added to the magnetic tape cartridge 30 illustrated in FIG. 6.

The magnetic tape cartridge 60 has a housing 60h having a top surface 60a, a bottom surface 60b, and side surfaces 60s. A magnetic tape that is wound around a reel 60r is placed in the housing 60h of the magnetic tape cartridge 60. Also in the second embodiment, similar to the first embodiment, holding grooves 61 provided in the side surfaces 60s at both sides of the housing 60h are used.

The holding grooves 61 are used by the hand mechanism 47 to handle the magnetic tape cartridge 60. A lock member 63 is arranged in each holding groove 61. The lock members 63 and the above-described lock holes 25a to 25d form a lock mechanism.

Each lock member 63 includes a projecting portion 63a, which is an example of an extending portion, a main portion 63b, a shaft portion 63c, and a coil spring 64, which is an example of an elastic member. The projecting portion 63a is a projection that extends substantially perpendicularly from a main wall surface of the main portion 63b. Instead of the projection, a step that extends substantially perpendicularly from a main wall surface of the main portion 63b may be formed on an upper section of the main portion 63b as the extending portion.

The main portion 63b is a flat plate including flat main wall surfaces and an inclined surface 63s at the bottom end of the main wall surfaces. The shaft portion 63c, which retains the lock member 63, is arranged on the top side of the main portion 63b. The coil spring 64 is fitted to the shaft portion 63c, and the shaft portion 63c is inserted into a hole 65 formed in an upper section of the holding groove 61. A ring portion 63d is provided at an end of the shaft portion 63c.

The size of the lock member 63 is set such that the lock members 63 may be placed in the holding groove 61. In other words, the sizes of the main portion 63b and the projecting portion 63a are determined in advance such that the lock member 63 does not protrude from the external shape of the cartridge housing 60h in the state in which the magnetic tape cartridge 60 is not locked in the magazine 11 (unlocked state).

The holding groove 61 has a first opening 61p and a second opening 61q. The first opening 61p opens in the corresponding side surface 60s of the cartridge housing 60h, and a holding portion of the hand mechanism 47, which will be described below, may be inserted into the holding groove 61 through the first opening 61p. The second opening 61q opens in the bottom surface 60b of the cartridge housing 60h, and a bottom end part of the main portion 63b projects and retracts through the second opening 61q. Similar to the first embodiment, the lock member 63 is placed in the holding groove 61 such that the projecting portion 63a projects toward the first opening 61p.

In the present embodiment, the first opening 61p and the second opening 61q are connected to each other. The shape of the second opening 61q may be changed to, for example, a through hole in accordance with the shape of the end part of the main portion 63b.

The holding groove 61 is surrounded by side walls 67a and 67b, a bottom wall 67c, and a top wall 67d. Stoppers 66a and 66b are provided on the side walls 67a and 67b, respectively. The coil spring 64 is pressed against the top wall 67d, so that the urging force of the coil spring 64 is applied to the main portion 63b.

Similar to the holding groove 31 according to the first embodiment, when the stoppers 66a and 66b are arranged to restrict the projecting portion 63a from moving downward, the lock member 63 is prevented from falling from the housing 60h. The lock member 63 is retained in the housing 60h such that the projecting portion 63a is vertically movable between the top wall 67d and the stoppers 66a and 66b. The latch member 71 is attached to a latch-member attachment portion 69 provided on the inner side of each side surface 60s.

Figure 14A:
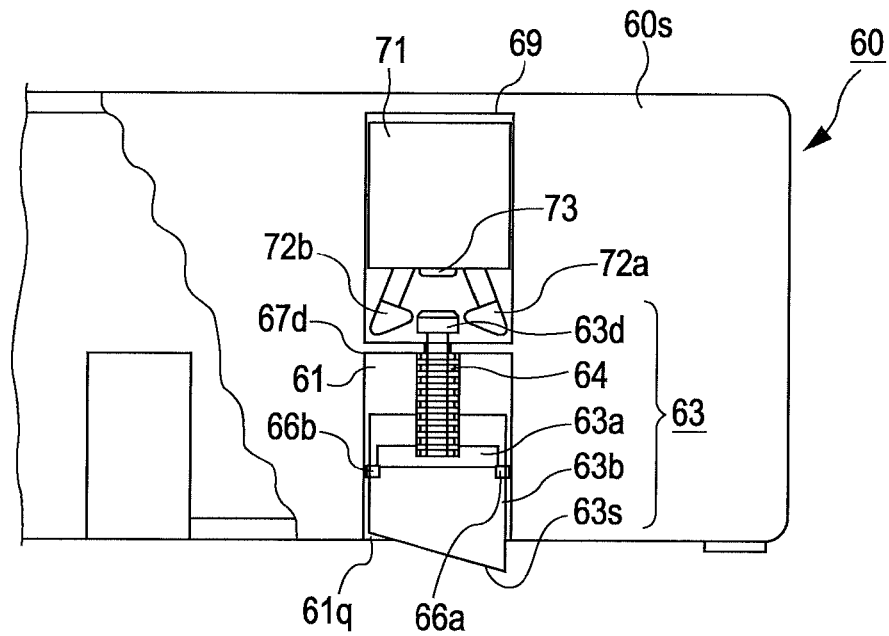
FIGS. 14A and 14B are plan views illustrating the lock member according to the second embodiment.
Figure 14B:
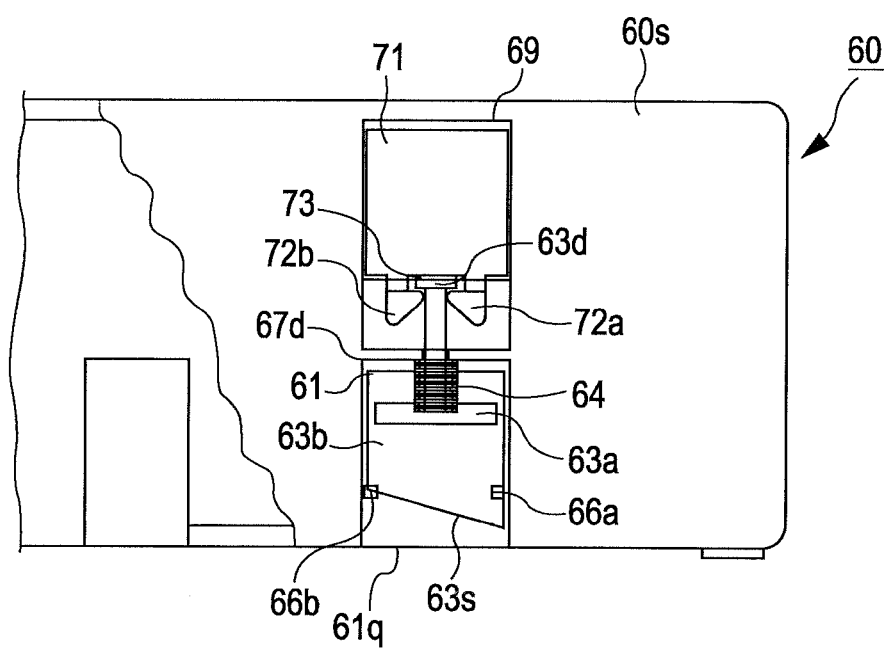

FIGS. 14A and 14B are plan views illustrating the lock member 63 according to the second embodiment. In the present embodiment, the latch member 71 that may be set to a latched state or an unlatched state by pushing the latch member 71 by a certain distance and then releasing the latch member 71 is explained as an example of a latch member. The latch member 71 includes latch arms 72a and 72b and a latch switch 73.

FIG. 14A illustrates the state in which the magnetic tape cartridge 60 is locked in the magazine 11 (locked state). The main portion 63b is pushed downward by the urging force of the coil spring 64, and the bottom end part (inclined surface 63s) of the main portion 63b protrudes outward from the second opening 61q by a certain amount.

In other words, the bottom end part of the main portion 63b protrudes by the certain amount from the bottom surface 60b of the cartridge housing 60h. The amount by which the bottom end part protrudes may be controlled by adjusting the positions at which the stoppers 66a and 66b are located.

FIG. 14A illustrates the state in which the lock member 63 is released from the latch member 71 (unlatched state). In the unlatched state, the latch arms 72a and 72b are opposed to each other such that the distance there between increases toward the ends thereof and are disengaged from the ring portion 63d.

FIG. 14B illustrates the state in which the magnetic tape cartridge 60 is not locked in the magazine 11 (unlocked state). When the lock member 63 is pushed upward (in a direction opposite to the urging direction), the coil spring 64 contracts and the bottom end portion (inclined surface 63s) of the main portion 63b is pulled upward through the bottom surface 60b of the cartridge housing 60h. In other words, the bottom end part of the main portion 63b is pulled up into the holding groove 61 through the second opening 61q. Thus, the lock member 63 is disengaged from the lock hole that faces the lock member 63, and is released from the locked state.

In the unlocked state, when the main portion 63b is pushed upward, the ring portion 63d pushes the latch switch 73 to the position where the lock member 63 is set to the latched state. Accordingly, the latch switch 73 is pushed upward and the latch arms 72a and 72b connected to the latch switch 73 are moved upward while the end portions thereof approach each other. As a result, the ring portion 63d is clamped by the latch arms 72a and 72b. Thus, the latch member 71 is capable of setting the lock member 63 to the latched state and maintaining the unlocked state.

Then, when the lock member 63 is to be released from the latched state, the main portion 63b is pushed upward so that the ring portion 63d presses the latch switch 73. Thus, the latch switch 73 is pushed upward. The latch switch 73 is pushed upward to the position where the lock member 63 may be released from the latched state, and is then released from the pressed state.

When the latch switch 73 is released from the pressed state, the latch switch 73 and the latch arms 72a and 72b connected to the latch switch 73 are moved downward. As the latch arms 72a and 72b are moved downward, the ends of the latch arms 72a and 72b move away from each other.

Then, when the ring portion 63d is released from the latch arms 72a and 72b, the lock member 63 is moved downward by the urging force of the coil spring 64. Then, the bottom end part of the main portion 63b projects from the bottom surface 60b of the cartridge housing 60h by a certain amount, so that the bottom end part engages with the lock hole that faces the bottom end part.

Figure 15A:
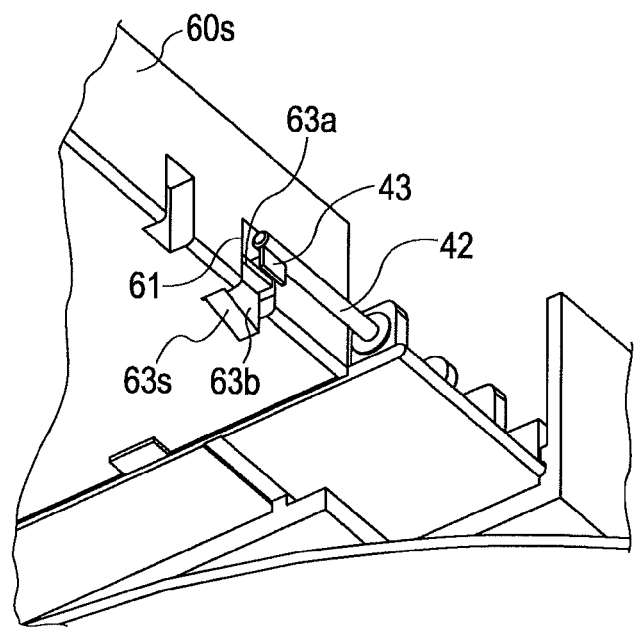
FIGS. 15A and 15B are diagrams illustrating the operation of an arm according to the second embodiment.
Figure 15B:
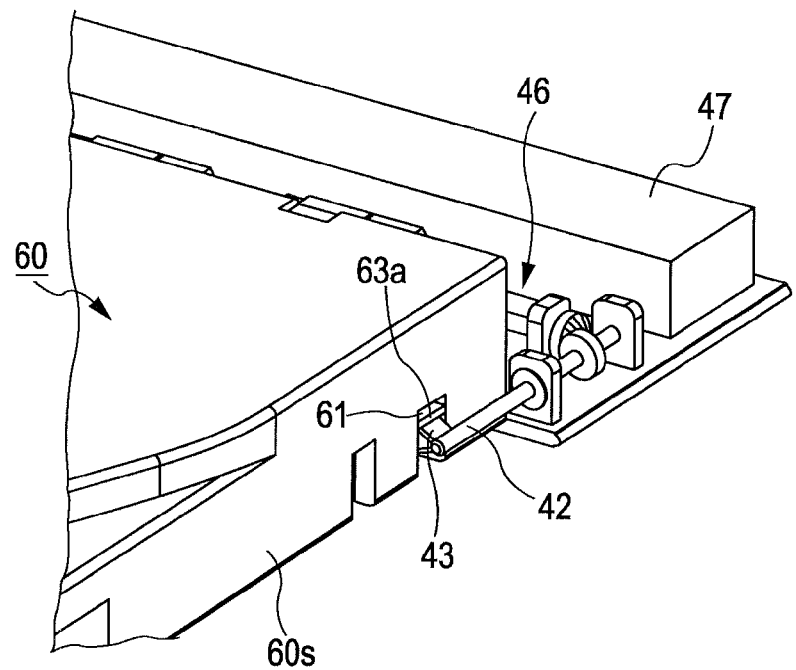
Figure 16A:
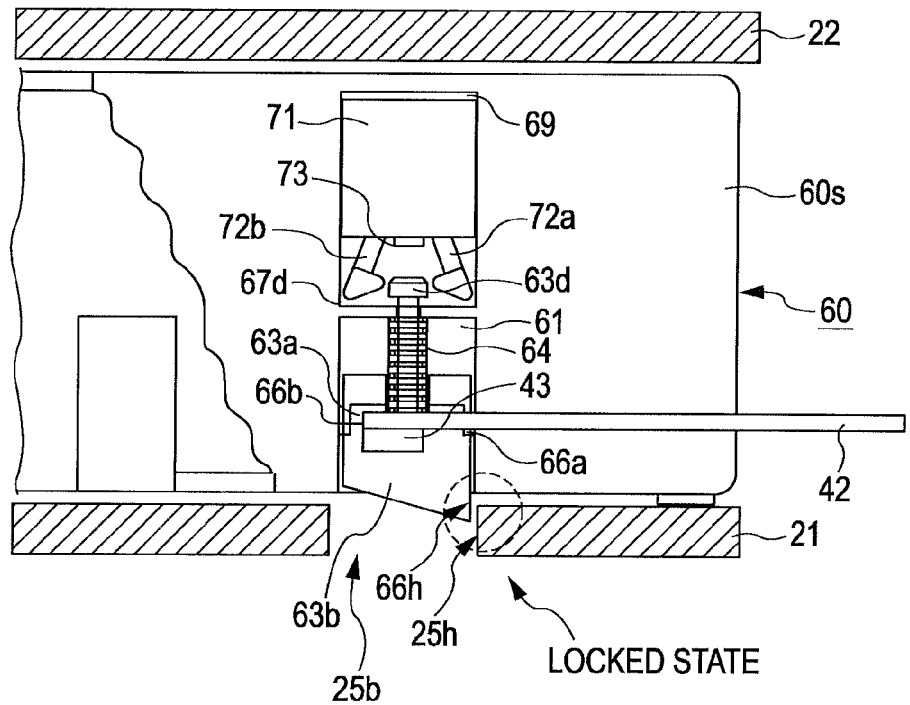
FIGS. 16A and 16B are diagrams illustrating the state in which the arm and the lock member are engaged with each other according to the second embodiment.
Figure 16B:
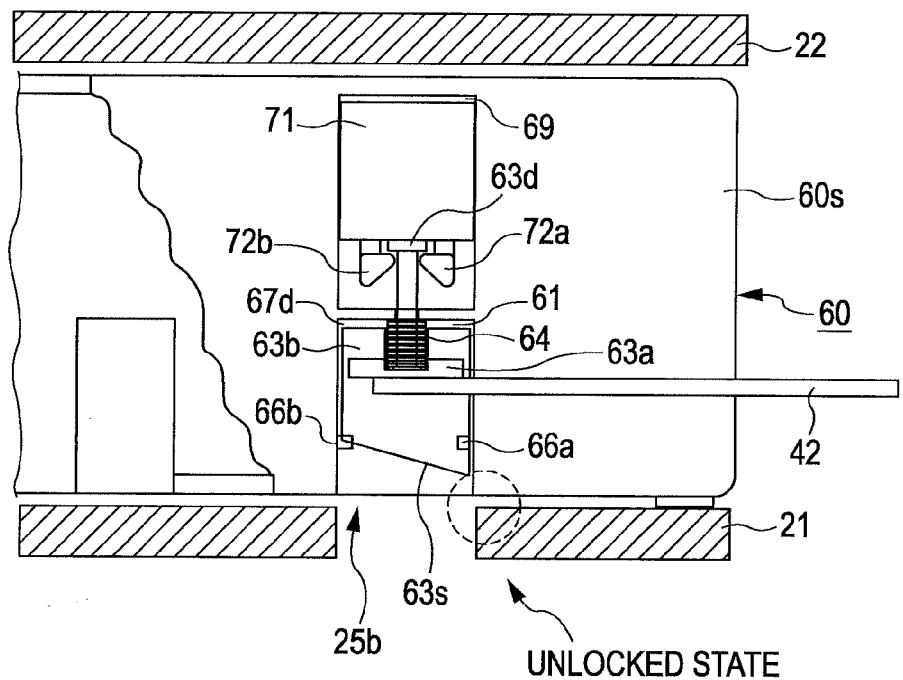
Figure 18A:
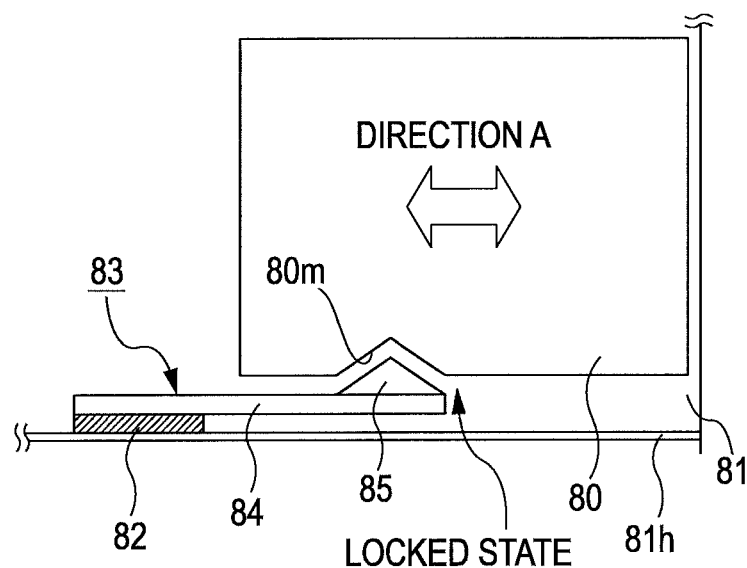
FIGS. 18A and 18B are diagrams illustrating a lock member according to the related art.
Figure 18B:
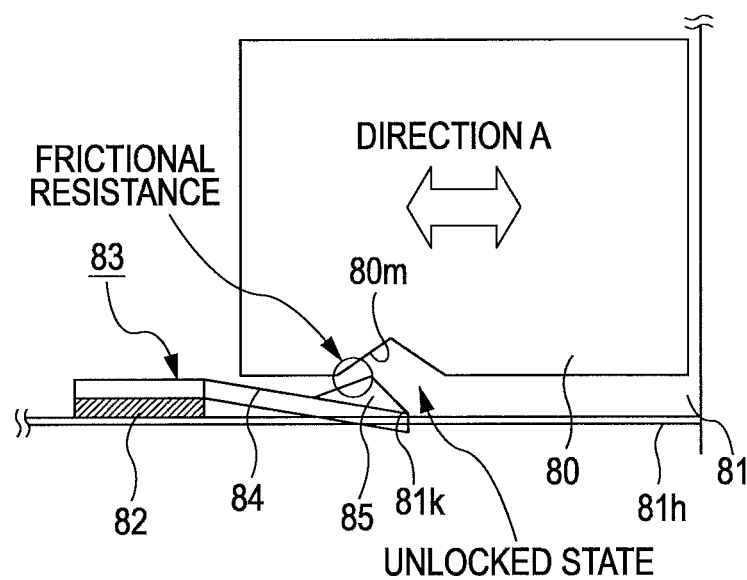

FIGS. 15A and 15B are diagrams illustrating the operation of one of the arms 42 according to the second embodiment. FIGS. 16A and 16B are plan views illustrating the state in which the arm 42 and the corresponding lock member 33 are engaged with each other according to the second embodiment. The state in which the magnetic tape cartridge 60 is stored in the cell 21b illustrated in FIG. 2 will be described as an example.

FIGS. 15A and 16A illustrate the state in which the magnetic tape cartridge 60 is locked in the magazine 11 (locked state). The magnetic tape cartridge 60 is inserted into the cell 21b in the magazine 11 by an operator.

The inclined surface 63s of the lock member 63 is inclined toward the open side of the cell 21b, and a part of the main portion 63b that is adjacent to the open side forms an acute angle. The acute angle may be set arbitrarily, but is preferably in the range of 10° to 30°.

Before the magnetic tape cartridge 60 is inserted into the cell 21b, the lock member 63 is latched by the latch member 71 in advance. After the magnetic tape cartridge 60 is inserted, the operator pushes the lock member 63 upward with a finger, a jig, or the like to release the lock member 63 from the latch member 71 Accordingly, the main portion 63b is pushed downward by the urging force of the coil spring 64 at the position where the main portion 63b faces the lock hole 25b, and the bottom end part (inclined surface 63s) thereof projects into the lock hole 25b through the second opening 61q.

Accordingly, the operator may smoothly insert the magnetic tape cartridge 60 into the magazine 11 without causing the lock member 63 to wear. Thus, durability of the lock member 63 may be increased and generation of dust due to wear of the lock member 63 may be suppressed.

When the lock member 63 is released from the latched state, the lock member 63 is fitted into the lock hole 25b and set to the locked state. Accordingly, the magnetic tape cartridge 60 cannot be easily taken out since a wall 63h of the main portion 63b near the open side of the cell 21b comes into contact with a wall 25h of the lock hole 25b near the open side of the cell 21b.

In other words, unless the operator releases the lock member from the locked state by pushing the lock member upward with a finger, a jig, or the like, the magnetic tape cartridge 60 cannot be easily taken out. Thus, the lock mechanism according to the present embodiment reliably prevents the magnetic tape cartridge 60 from falling from the magazine (cell).

To eliminate the above-described locking/unlocking operation performed by the operator, the main portion 63b of the lock member 63 may be set to a projecting state (be disposed at the lock position) before the magnetic tape cartridge 60 is inserted into the cell 21b.

When the magnetic tape cartridge 60 is inserted into the cell 21b in this state, the bottom end part (inclined surface 63s) of the main portion 63b slides along the bottom wall surface of the cell 21b. Then, the main portion 63b is pushed downward by the urging force of the coil spring 64 at the position where the main portion 63b faces the lock hole 25b, and the bottom end part (inclined surface 63s) thereof projects into the lock hole 25b through the second opening 61q.

In this case, the magnetic tape cartridge 60 may be automatically locked in the magazine 11 without the operation performed by the operator. If the number of times the magnetic tape cartridge 60 is replaced is small, it is not necessary to consider the wear of the main portion 63b and the cell 21b. Therefore, the installation method may be selected as appropriate by the operator.

After the magazine 11 is inserted into the magnetic tape library apparatus 1, the latching and unlatching operations and the locking and unlocking operations are performed by the pair of arms 42 in the hand mechanism 47. The robot mechanism 40 receives a command to move the magnetic tape cartridge 60 in the cell 21b to the magnetic tape drive 15 from the controller 17. Accordingly, the robot mechanism 40 drives the robot motor to move the hand mechanism 47 to the position where the hand mechanism 47 faces the cell 21b.

Then, the hand mechanism 47 is horizontally moved by the first motor 44 so that each arm 42 is inserted into the cell 21b. As illustrated in FIGS. 15A and 16A, each arm 42 is inserted into the cell 21b such that the holding portion 43 thereof faces the corresponding holding groove 61 in the magnetic tape cartridge 60. At this time, the holding surface of the holding portion 43 is parallel to the side surface 60s.

Next, each arm 42 is rotated by the second motor 45 such that the holding portion 43 is rotated by about 90°. Accordingly, as illustrated in FIGS. 15B and 16B, the holding portion 43 is inserted into the holding groove 61 through the first opening 61p, comes into contact with the projecting portion 63a, and pushes the projecting portion 63a upward. As a result, the lock member 63 is moved upward and placed in the holding groove 61. As a result of this operation, the main portion 63b is disengaged from the lock hole 25b and the lock member 63 is released from the locked state.

Then, the holding portion 43 is further rotated to the angular position of about 100°, so that the ring portion 63d pushes the latch switch 73 upward and the lock member 63 is latched by the latch member 71.

The hand mechanism 47 returns the holding portion 43 to the angular position of about 90°. At this time, the lock member 63 is set to the state in which the lock member 63 is latched by the latch member 71 (latched state). Then, each arm 42 is horizontally moved by the first motor 44 so that the magnetic tape cartridge 60 is pulled out from the cell 21b and placed on the robot 51.

Then, the robot mechanism 40 conveys the magnetic tape cartridge 60 to the magnetic tape drive 15. Next, the robot 51 is rotated by 90° so that the hand mechanism 47 faces the insertion/extraction slot 15e in the magnetic tape drive 15. The hand mechanism 47 is horizontally moved by the first motor 44 so as to push the magnetic tape cartridge 60 into the insertion/extraction slot 15e.

The cartridge according to the second embodiment is inserted into the magnetic tape drive 15 while the lock member is latched by the latch member (in the latched state). Therefore, the lock member is not set to the non-engaged state as described above with reference to FIG. 11C. Accordingly, the magnetic tape cartridge 60 may be smoothly inserted into the magnetic tape drive 15 without causing the lock member 63 to wear. Thus, durability of the lock member 63 may be increased and generation of dust due to wear of the lock member 63 may be suppressed.

When the lock member 63 is maintained at the latched state, the magnetic tape cartridge 60 may be inserted into a magazine the does not have the lock holes as in the present technology or used in a library apparatus that does not have the lock mechanism according to the present technology. Thus, compatibility with other library apparatuses is ensured.

Then, when the magnetic tape cartridge 60 is ejected from the insertion/extraction slot 15e in the magnetic tape drive 15, the hand mechanism 47 is horizontally moved by the first motor 44 so that the holding portion 43 of each arm 42 faces the corresponding holding groove 61 in the magnetic tape cartridge 60. At this time, the holding surface of the holding portion 43 is parallel to the side surface 60s.

Next, each arm 42 is rotated by the second motor 45 such that the holding portion 43 is rotated by about 90°. Accordingly, the holding portion 43 is inserted into the holding groove 61 through the first opening 61p. During this operation, the latched state is maintained. Then, each arm 42 of the hand mechanism 47 is horizontally moved by the first motor 44 so that the magnetic tape cartridge 60 is pulled out from the magnetic tape drive 15 and placed on the robot 51.

Then, the robot mechanism 40 conveys the magnetic tape cartridge 60 to the cell 21b. The robot 51 is rotated by −90° so that the hand mechanism 47 faces the open side of the cell 21b. The magnetic tape cartridge 60 is inserted into the cell 21b by the holding portion 43.

After the magnetic tape cartridge 60 is inserted into the cell 21b, the holding portion 43 is rotated to the angular position of about 100°, so that the lock member 63 is moved further upward. Accordingly, the latch switch 73 of the latch member 71 is pushed upward by the ring portion 63d, so that the lock member 63 is released from the latched state. Then, the holding portion 43 is rotated in the reverse direction to the angular position of 0° to return to the original position. Thus, the holding surface of the holding portion 43 becomes parallel to the side surface 60s.

Thus, the projecting portion 63a is disengaged from the holding portion 43, and the lock member 63 is pushed downward by the urging force of the coil spring 64 and fitted into the lock hole 25b that faces the lock member 63. The hand mechanism 47 is horizontally moved by the first motor 44 while the holding portion of each arm 43 is at the initial position (0°), so that each arm 42 is moved away from the cell 21b.

FIG. 17 is a diagram illustrating the positional relationship between the holding portion 43 of one of the arms 42 and the corresponding lock member 63. FIG. 17 illustrates the state in which, for example, the arm 42 is inserted in the cell 21b. In addition, the left part of FIG. 17 illustrates the state in which the main portion 63b is fitted in the lock hole 25b in the cell 21b and the magnetic tape cartridge 60 is locked in the magazine 11 by the lock member 63.

As illustrated in FIG. 17, the contact surface of the projecting portion 63a that comes into contact with the holding portion 43 is positioned below the rotational center of the arm 42 in the locked state. Referring to FIG. 17, when the main portion 63b is moved by the holding portion 43, the top surface of the main portion 63b is moved between a lock position A, an unlock position B, and a latch position/unlatch position C. The latch position/unlatch position C is higher than the lock position A and the unlock position B.

Here, it is assumed that the lock member 63 is at the lock position A. In addition, the holding portion 43 of the arm 42 is at an angular position of 0° (initial position). In this state, the lock member 63 and the holding portion 43 of the arm 42 are not engaged with each other.

Then, when the holding portion 43 is rotated, the holding portion 43 engages with the projecting portion 63a of the lock member 63 and pushes the main portion 63b upward. When the angular position is about 90°, the lock member 63 reaches the unlock position B. At this time, the main portion 63b is disengaged from the lock hole 25b and the magnetic tape cartridge 60 is released from the magazine 11.

Then, when the holding portion 43 is further rotated to the angular position of about 100°, the lock member 63 reaches the latch position C and is latched by the latch member 71. In other words, when the main portion 63b is moved upward to the latch position C, the ring portion 63d at the end of the shaft portion 63c pushes the latch switch 73 to the position where the latched state is established. Accordingly, as described above, the lock member 63 is latched by the latch member 71.

Then, when the projecting portion 63a is disengaged from the holding portion 43, the lock member 63 is maintained at the unlock position while being in the latched state. When the lock member 63 is to be released from the latched state, the holding portion 43 is rotated to the angular position of about 100°, so that the main portion 63b is moved upward to the unlatch position C.

Accordingly, the ring portion 63d at the end of the shaft portion 63c pushes the latch switch 73 to the position where the lock member 63 may be released from the latched state. Thus, as described above, the lock member 63 may be released from the state in which the lock member 63 is latched by the latch member 71.

When the lock member 63 is released from the latched state, the main portion 63b is moved downward by the urging force of the coil spring 64, and returns to the lock position. When the lock member 63 is latched by the latch member 71 while the lock member 63 is in the unlocked state, no friction occurs between the lock member 63 and the cells 21a to 21d. Therefore, the magnetic tape cartridge 60 may be smoothly inserted into and extracted from the cells 21a to 21d.

As described above, the lock mechanism using the cartridge according to the second embodiment performs the locking and unlocking operations and the latching and unlatching operations by using the rotation of the holding portion 43 of each arm 42. By driving the holding portion 43, the locked state may be reliably established without using a lock member that is designed in consideration of the lock force. In addition, the unlocked state may be reliably established without making the structure of the hand mechanism 47 complex (without using a large high-performance hand motor) in consideration of the inserting-and-extracting performance.

Therefore, according to the lock mechanism using the cartridge of the second embodiment, the locked state and the unlocked state may be reliably established by using a small structure without increasing the sizes of the magazines and the library apparatus or making the structures thereof complex. In addition, in the cartridge according to the second embodiment, since the latch member is provided, durability of the lock member may be increased and generation of dust due to wear of the lock member may be suppressed.

Although the magnetic tape cartridges and the magnetic tape library apparatus are explained in the first and second embodiments, the present technology may also be applied to optical disc cartridges and optical disc library apparatuses. In addition, the lock mechanism for the cartridges may be applied not only to the cartridges of recording media but also to cartridges that house articles or tray-type cartridges on which articles are mounted.

Accordingly, the library apparatus according to the present technology includes storage systems that store cartridge-type articles, and the hand mechanism according to the present technology may be used as a hand mechanism for use in such a storage systems. Also in this case, as described above, the storage space for the cartridges may be reduced, and the size of the storage unit in the storage system may be reduced accordingly.

All examples and conditional language recited herein are intended for pedagogical purposes to aid the reader in understanding the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A library apparatus comprising:
    a storage member having a lock hole in which a lock member provided on a cartridge is capable of being fitted, the storage member storing the cartridge in a locked state when the lock member is fitted in the lock hole;
    a holding member that holds the cartridge and engages with the lock member;
    an arm that supports the holding member at an end of the arm, the arm inserting and extracting the cartridge held by the holding member into and from the storage member;
    a first motor that moves the arm in an insertion-extraction direction in which the cartridge is inserted and extracted; and
    a second motor that moves the holding member so as to move the lock member to a position at which the lock member is released from the lock hole.

2. The library apparatus according to claim 1,
    wherein the cartridge includes a cartridge housing in which a holding groove is formed, the holding groove having a first opening in a side surface of the cartridge and a second opening formed in one of a top surface and a bottom surface of the cartridge, the side surface facing the holding member, and
    wherein the lock member is disposed in the holding groove and includes an elastic member, a main portion having a first end and a second end, and an extending portion that extends from the main portion toward the first opening, the second end of the main portion protruding outward from the second opening when the first end of the main portion is pressed by an urging force of the elastic member.

3. The library apparatus according to claim 2,
    wherein the holding member is rotated by the second motor so as to push the extending portion in a direction opposite to a direction of the urging force of the elastic member and move the lock member to the position at which the lock member is released from the lock hole.

4. The library apparatus according to claim 2,
    wherein the cartridge housing includes a latch member that latches the lock member by engaging with the main portion so that the second end of the main portion does not protrude from the second opening in response to the urging force of the elastic member.

5. The library apparatus according to claim 4,
    wherein the holding member is rotated by the second motor so as to move the lock member to a position where the lock member is latched by the latch member and/or a position where the lock member is released from the latch member.

6. The library apparatus according to claim 1,
    wherein a thickness of the holding member is smaller than or equal to a width of the arm in a thickness direction of the holding member.

7. The library apparatus according to claim 6,
    wherein the holding member is a flat plate that is arranged along a longitudinal direction of the arm.

8. A hand mechanism that holds a cartridge having a groove in a side surface thereof, the hand mechanism comprising:
    an arm;
    a holding member that is provided at an end of the arm and holds the cartridge by engaging with the groove;
    a first motor that moves the arm to a position at which the holding member faces the groove; and
    a second motor that rotates the holding member so that the holding member engages with the groove at the position at which the holding member faces the groove.

9. The hand mechanism according to claim 8,
    wherein a thickness of the holding member is smaller than or equal to a width of the arm in a thickness direction of the holding member.

10. The hand mechanism according to claim 9,
    wherein the holding member is a flat plate that is arranged along a longitudinal direction of the arm.

\* \* \* \* \*